US012593183B2

(12) United States Patent
Riemer et al.

(10) Patent No.: US 12,593,183 B2
(45) Date of Patent: Mar. 31, 2026

(54) HEARING SYSTEM COMPRISING A HEARING AID AND A PROCESSING DEVICE

(71) Applicant: Oticon A/S, Smørum (DK)

(72) Inventors: Lars Riemer, Smørum (DK); Martin Bergmann, Smørum (DK); Christian Veng, Smørum (DK); David Thorn Blix, Smørum (DK)

(73) Assignee: Oticon A/S, Smørum (DK)

( * ) Notice: Subject to any disclaimer, the term of this patent is extended or adjusted under 35 U.S.C. 154(b) by 387 days.

(21) Appl. No.: 18/106,773

(22) Filed: Feb. 7, 2023

(65) Prior Publication Data

US 2023/0188909 A1 Jun. 15, 2023

Related U.S. Application Data

(62) Division of application No. 17/356,724, filed on Jun. 24, 2021, now Pat. No. 11,638,106.

(30) Foreign Application Priority Data

Jun. 25, 2020 (EP) .................................... 20182260

(51) Int. Cl.
*H04R 25/00* (2006.01)

(52) U.S. Cl.
CPC ......... *H04R 25/556* (2013.01); *H04R 25/507* (2013.01); *H04R 25/558* (2013.01);
(Continued)

(58) Field of Classification Search
CPC ...... H04R 25/04; H04R 25/55; H04R 25/554; H04R 25/558; H04R 2225/55
See application file for complete search history.

(56) References Cited

U.S. PATENT DOCUMENTS 5,721,783 A * 2/1998 Anderson ......... H04M 1/72421 381/328
7,072,480 B2 * 7/2006 Rass .................... H04R 25/407 381/317

(Continued)

FOREIGN PATENT DOCUMENTS

EP 3 588 985 A1 1/2020
FR 2651634 A1 * 3/1991 ........... H04R 25/554

(Continued)

OTHER PUBLICATIONS

Partial European Search Report for European Application No. 21180584.1, dated Nov. 19, 2021.

(Continued)

*Primary Examiner* — Ryan Robinson
(74) *Attorney, Agent, or Firm* — Birch, Stewart, Kolasch & Birch, LLP

(57) ABSTRACT

A hearing aid comprises an input transducer configured to convert sound around a user to at least one electrical input signal representing the sound; an output transducer for providing an audible signal based on the at least one electrical input signal; transceiver circuitry configured to establish a wireless audio communication link with a secondary device; and a processor configured to operate the hearing aid in a system mode or a device mode. The hearing aid is configured to initiate establishment of the wireless audio communication link in dependence of a mode control signal. A non-wearable device comprising transceiver circuitry configured for establishing a wireless audio communication link with a hearing aid comprises a processor configured to receive and process at least one electrical input signal from a hearing aid to at least partially compensate for hearing impairment of a user; a power supply interface. The (Continued)

non-wearable device is integrated with another device having a specific other function.

13 Claims, 8 Drawing Sheets

(52) U.S. Cl.
CPC ...... *H04R 25/602* (2013.01); *H04R 2225/025* (2013.01); *H04R 2225/55* (2013.01)

(56) References Cited

U.S. PATENT DOCUMENTS

| | | | | |
|---|---|---|---|---|
| 7,508,162 | B2 | 3/2009 | Lippojoki et al. | |
| 7,748,432 | B2 | 7/2010 | Huang | |
| 7,929,713 | B2 * | 4/2011 | Victorian | H04R 25/554 381/328 |
| 7,929,722 | B2 * | 4/2011 | Shridhar | H04R 25/554 381/314 |
| 8,145,246 | B2 * | 3/2012 | Rasmussen | H04R 25/554 455/7 |
| 8,706,247 | B2 * | 4/2014 | Mishra | A61N 1/36038 607/57 |
| 8,824,710 | B2 * | 9/2014 | Goorevich | H04R 25/43 381/314 |
| 8,917,890 | B2 * | 12/2014 | DiGiovanni | H04R 25/75 381/23.1 |
| 9,124,984 | B2 * | 9/2015 | Yamada | H04R 25/407 |
| 9,627,903 | B2 | 4/2017 | Schwartz | |
| 9,906,873 | B2 * | 2/2018 | Zhang | H04R 25/505 |
| 10,433,075 | B2 * | 10/2019 | Crow | H04R 25/554 |
| 10,904,666 | B2 | 1/2021 | Pedersen et al. | |
| 2004/0208325 | A1 * | 10/2004 | Cheung | H04H 20/72 381/79 |
| 2005/0100182 | A1 * | 5/2005 | Sykes | G09B 21/009 379/430 |
| 2009/0097291 | A1 * | 4/2009 | Bormann | G06F 1/26 363/126 |
| 2013/0343584 | A1 * | 12/2013 | Bennett | A61J 1/00 381/317 |
| 2014/0270287 | A1 * | 9/2014 | Park | H04R 25/558 381/313 |
| 2015/0281853 | A1 | 10/2015 | Eisner et al. | |
| 2019/0268706 | A1 * | 8/2019 | Solum | H04R 25/65 |
| 2021/0352420 | A1 | 11/2021 | Liu et al. | |
| 2022/0095061 | A1 | 3/2022 | Diehl et al. | |

FOREIGN PATENT DOCUMENTS

| | | | |
|---|---|---|---|
| WO | WO 2017/116791 | A1 | 7/2017 |
| WO | WO 2019/077443 | A1 | 4/2019 |
| WO | WO 2019/084214 | A1 | 5/2019 |
| WO | WO 2020/040638 | A1 | 2/2020 |

OTHER PUBLICATIONS

Extended European Search Report issued in European Application No. 24214606.6 on Apr. 7, 2025.

* cited by examiner

System mode of operation

Device mode of operation (a)

Device mode of operation (b)

HEARING SYSTEM COMPRISING A HEARING AID AND A PROCESSING DEVICE

This application is a Divisional of copending application Ser. No. 17/356,724, filed on Jun. 24, 2021, which claims priority under 35 U.S.C. § 119(a) to Application No. 20182260.8, filed in Europe on Jun. 25, 2020, all of which are hereby expressly incorporated by reference into the present application.

BACKGROUND

A hearing aid is limited in computing power (and memory) by its generally small size (e.g. with a maximum outer dimension of the order of 0.05 m (or ≤0.03 m)). It has been suggested to include a separate (body worn or portable) device in communication with earpieces of the hearing aid to provide extra processing power (see e.g. U.S. Pat. No. 5,721,783). This has previously come with the cost of a long latency (and thus in practice been of limited use, e.g. focused on analysis and processing tasks for which the latency is acceptable).

SUMMARY

Recent developments in wireless technology (and chip technology) providing low latency, low power, broadband wireless communication has changed this, however. Utilizing such technologies, hearing aid functionality may be provided by wearable devices, e.g. an earpiece (or a pair of earpieces), providing the audio (sound) interface (e.g. microphone(s) and output transducer(s)) and a non-wearable (external) processing device providing processing power and memory a factor of 100 or 1000 or more larger than current state of the art hearing aid processors. Thereby the use of processing algorithms for implementing advanced functionality, e.g. voice control interfaces (e.g. including keyword detection, speech recognition, etc.) or other computationally complex features, e.g. using artificial intelligence (e.g. deep neural networks with a useful number of nodes) can be seriously considered in a hearing aid framework. The earpiece part of the hearing aid may thus, at least in certain modes of operation, be limited to input transducer(s) (e.g. microphone(s)) and an output transducer (e.g. a loudspeaker) and a transceiver. The processing power may be located in a separate (wearable or non-wearable) device, which may not be subject to the same size constraints as the earpiece(s). Hence, the novel technologies (e.g. Ultra WideBand (UWB)) enable a new kind of hearing aid(s) with more processing power, where the processing power resides in a device already worn by the hearing aid user (e.g. a smartphone or a smartwatch, or a remote control device, or a dedicated hearing aid processing device) or—in certain situations—in a stationary ('non-wearable') device, e.g. connected to the electricity network (or having a large energy reservoir, e.g. battery or other localized energy source). The stationary, non-wearable, device may be configured to draw supply current from an electricity network, either from a direct connection via a mains plug (and/or socket), or via an indirect connection, e.g. via another device or system (that is connected to the electricity network). The stationary, non-wearable, device may have a (direct or indirect) wired connection to a source of energy, e.g. to a mains power supply, e.g. an electricity network. The stationary, non-wearable, device may have access to draw current from a (large) local energy source, e.g. a battery, e.g. a rechargeable battery or an (electric) energy accumulator or an electricity generator (e.g. fuel cells or solar cells). The stationary, non-wearable, device may comprise a wireless connection to a power supply allowing power to be wirelessly transferred to the non-wearable device (e.g. via an inductive charging process, e.g. resonant charging). The stationary, non-wearable, device may have a function of its own other than providing enhanced processing capability to a hearing aid. The stationary, non-wearable, device may be an accessory to a hearing aid, e.g. an audio interface to a TV, or to land line telephone, or it may be a charging station to a hearing aid or to a pair of hearing aids. The stationary, non-wearable, device may be portable, e.g. such as a charger for the hearing aid(s), but typically requires a cabled connection to an electricity network to perform its normal function (e.g. as a charger for the hearing aids). The non-wearable (e.g. portable) device may comprise a local (e.g. rechargeable) battery as an alternative to, or in addition to a connector to the electricity network. Thereby the non-wearable device can provide its function (including (at least) its function as an external processor for the wearable device) even in the absence of access to the electricity network. The battery or the non-wearable device may have a (significantly) larger capacity than a battery of the wearable device (e.g. a hearing aid).

When the wearable device(s), e.g. ear pieces, are localized in or at the non-wearable device embodied in a charging station (e.g. for charging a battery of the non-wearable device(s), e.g. during sleep of the user), data from the wearable device(s), which have been logged since the last charging session, may e.g. be captured by the charging station. The captured data may e.g. be processed for AI-purposes (e.g. to improve data of relevance to the particular user, e.g. to update weights of a neural network based on data gathered by the user (to provide a 'personalized' hearing aid system)). Logged data may e.g. include data representing different acoustic environments experienced by the user over time, e.g. signal-to-noise ratio (SNR) vs time, or input sound levels vs. time. The data can be used to classify and focus audio processing on the typical listening environments of the user (and possible down-scale importance of other environments). The typically long time period of a charging session, e.g. 6-10 hours may be particularly beneficial for exchange of data and in particular for processing data to update weights of neural network applications of the hearing aid system, which is otherwise not feasible during normal use of the hearing aid system. Such AI-based applications may e.g. include directionality, level compression, SNR-estimation, own voice detection and/or estimation, etc. When the wearable device(s), e.g. ear pieces, are positioned in the charging station, a minimum time available for processing may be estimated (e.g. from the rest capacity of the battery, from the time of day, from knowledge of user behavior, calendar information, etc.). The (estimated) minimum time available for processing may be used to decide on the hearing aid related tasks being conducted by the non-wearable device while the hearing aid(s) is/are being charged, e.g. download of logged data from the hearing aid(s), or update of weights for a neural network, or upload of a software or firmware update, etc.

By using a processor of the non-wearable device, processing heavy and/or power-hungry problems may to be solved, e.g.:

1. Audio processing in general (e.g. providing a frequency and level dependent gain to an input signal representing sound in the environment of a user to compensate for a hearing impairment of the user).

2. Facilitate the use of larger neural networks processed away from the wearable part of the hearing aid (but without using the cloud).
3. Providing a voice control interface (including wake-word and command-word detection) or more generally automatic speech recognition.
4. Providing remote microphone functionality (e.g. including directional information related to sound sources in the environment).
5. Providing interfaces to data networks.

The (large) local energy source of the non-wearable device (or a device or system connected to the wearable device) may be 100 to 1000 times or more (e.g. several orders of magnitude) larger than a local battery source of the wearable device (or practically unlimited, when connected to a mains power supply).

A Hearing Aid System:

In an aspect of the present application a hearing aid system configured to compensate for a hearing impairment of a user is provided. The hearing aid system may comprise

- a wearable device adapted for being worn by the user and comprising
  - an input stage comprising at least one input transducer for converting sound around the user to at least one electric input signal representing said sound, and
  - an output transducer for providing stimuli representative of a processed version of said least one electric input signal to said user, said stimuli being perceivable by said user as sound, and
- a non-wearable device comprising
  - a processor, and
  - a power supply interface for providing power to the processor.

The wearable device and the non-wearable device may comprise respective transceiver circuitry for establishing a wireless audio communication link (e.g. a low latency wireless link) between them.

The processor of the non-wearable device may comprise an audio processor configured to process said at least one electric input signal, or a signal originating therefrom, to at least partially compensate for the hearing impairment of the user and to provide said processed version thereof.

The hearing aid system may provide that the power supply interface of the non-wearable device is electrically connected to an electricity network (the mains supply), and/or to a local energy source of the non-wearable device (e.g. an energy source, e.g. the battery, such as rechargeable battery, with a capacity much larger than that of the wearable device, e.g. 10-100 times larger or more).

Thereby an improved processing power of a hearing aid may be provided.

The term 'wearable device' is in the present context intended to mean a device that is configured to be worn by the user, e.g. in that it has a form and size and/or comprises attachment elements that facilitates it's fixation to the body (e.g. to an ear, to an arm or other body part), and/or to clothing (e.g. to a shirt or pants), and/or to be carried in a pocket of clothing of the user.

The term 'non-wearable device' is in the present context intended to mean a device that is not intended to be (generally) worn by a user, e.g. because it is too large or too heavy or has a form that makes it 'unhandy' to carry. The term 'non-wearable device' may in the present context be taken to mean a device that is intended to be located at a particular place, or has a particular main function (other than being an external processor of the wearable device(s)), where it is stationary located during exercise of that function (e.g. a charger of the hearing aid(s), or e.g. because it is electrically connected to another device (e.g. a TV-sound transmission device ('TV-Box') connected to a TV-set), or because it needs a cabled connection to a mains power supply to function. The term 'non-wearable device' may be taken to include a smartphone or other (normally wearable device), when such device is fixed to a specific location, e.g. while being connected to a mains power supply while its battery is being re-charged.

The non-wearable device may be characterized in that the transceiver circuitry for establishing a wireless audio communication link to the wearable device is a dedicated short-range transceiver circuitry, e.g. based on Bluetooth, UWB, Zigbee, or other standardized or proprietary protocols. A short-range wireless audio link may e.g. be limited to a range below 50 m, such as below 20 m, such as below 10 m.

The use of a non-wearable (stationary) device to form part of the hearing aid system has, in addition to enhanced processing and connectivity potential, the further advantage of allowing it to be calibrated to the room or location where it is placed (e.g. to allow attenuation of known, unwanted sound sources, or to adapt to (or connect to) known sound sources of interest).

The audio processor may be configured to apply one or more processing algorithms, e.g. a compressive amplification algorithm configured to apply a frequency and level dependent gain to the at least one electric input signal or a signal originating therefrom to at least partially compensate for the user's hearing impairment. The processing power of the processor of the non-wearable device may be several times larger than that of a normal hearing aid processor, e.g. 5 times or 10 times or 100, or 1000 times larger. Thereby tasks that would otherwise not be manageable for a typical hearing aid processor (e.g. computing tasks related to artificial intelligence (neural networks, etc.)) can be performed in the processor of the non-wearable device and the results included in a processed signal without significant delay, if the wireless audio communication link is sufficiently fast (has low latency) and broad-banded. Thereby, complex tasks, such as real-time flagging of semantic errors, translation from another language, on-line training, on-line correction or change of processing parameters, etc., can be handled by the hearing aid system.

The wearable device may have a local energy source, e.g. a battery, such as a rechargeable battery. The local energy source has a relatively small capacity (due to size constraints). A battery for a hearing aid typically has a capacity of less than 1 Ah, e.g. less than 500 mAh or smaller. The non-wearable device may e.g. be connected to an electricity network directly, or e.g. indirectly, via a connection to another device or system. The electricity network may be based on a primary AC-voltage, e.g. above 100 Vpp, e.g. with a frequency around 50 Hz. The electricity network may be based on a primary DC-voltage, e.g. above 100 V. The non-wearable device (or a device or system electrically connected to the non-wearable device) may comprise a transformer for down-scaling the primary voltage of the electricity network to a secondary, lower voltage. The non-wearable device (or a device or system electrically connected to the non-wearable device) may comprise a rectifier for converting an AC-voltage (e.g. the secondary AC-voltage) to a DC-voltage (and possibly further DC-DC converters for providing one or more other DC-voltages from the main DC-voltage), which can be used as a power supply voltage for electronic components of the non-wearable device.

The input stage may comprise two or more input transducers. An input transducer may comprise a microphone. The at least one input transducer may be or comprise a microphone.

The wearable device may comprise an earpiece adapted for being located at or in an ear of a user, or for being partially of fully implanted in the head at an ear of a user. The earpiece may comprise the input stage or at least a part thereof. The earpiece may comprise at least one of the at least one input transducers. At least one of the at least one input transducers may be located elsewhere on the body of the user (i.e. separate from the earpiece). The earpiece may comprise the input stage.

The hearing aid system may comprise at least one further input transducer (providing at least one further electric input signal), e.g. at least one microphone. The at least one further input transducer may be located external of the earpiece, e.g. in further wearable device or external of the wearable device(s). The at least one further input transducer may form part of the non-wearable device. The at least one further input transducer may be connected to the processor of the non-wearable device. The at least one further input transducer may form part of a further device, e.g. a dedicated microphone unit, or another fixed or portable device. The at least one further input transducer may be better positioned to pick up sound from a sound source of interest to the user (or a noise source that should be isolated, e.g. removed) than the at least one input transducer of the wearable device (e.g. an earpiece). Thereby better noise reduction or speech intelligibility may be provided (than with the at least one input transducer of the wearable device alone).

The non-wearable device may comprise a connector for electrically connecting the power supply interface to the electricity network via an electric cable. The non-wearable device, or a device which the non-wearable device is integrated with or form part of, may comprise a connector for electrically connecting the device to the electricity network.

The non-wearable device may be integrated with another device having a specific other function or purpose. The non-wearable device may be integrated with a wireless audio interface device, e.g. for a TV-set or for a land-line telephone connection, and/or a charging station, for charging a rechargeable battery of the wearable device, e.g. a hearing aid (e.g. an ear piece of a hearing aid, or one or more earpieces of a binaural hearing aid system). The non-wearable device may comprise a local energy source, e.g. a battery, such as a rechargeable battery, e.g. in addition to the connection to the electricity network. The non-wearable device may be integrated with another device that is specifically adapted to service (and form part of) the hearing aid system according to the present disclosure. The specific other function or purpose may comprise an audio interface for the wearable device to a TV or other audio or audio-visual device or system, or to a telephone. The specific other function or purpose may comprise a charging interface to the wearable device.

The non-wearable device in the form of a charging station may be configured to provide charging and storage of the wearable device(s). This has the advantage of providing storage for the wearable device(s) when user needs to take them off (e.g. while sleeping and/or when traveling), it provides charging of the rechargeable batteries of the wearable device(s) while being stored (which may extend the effective battery life), and providing extra processing power to the wearable device(s) during storage and/or during use when the user is wearing the wearable device(s) within a range of operation of a wireless link between the wearable and the non-wearable devices.

The non-wearable device may, in addition to charging the non-wearable device, provide one or more of the following features:

- A (possibly supplementary or alternative) user interface (UI) for the hearing aid system, e.g. implemented as a graphical user interface, e.g. using a touch sensitive screen, or individual activation elements or indicators, such as a button for pairing, an LED for showing battery life, etc.
- A remote control for the wearable device(s) (e.g. allowing control of volume, control of audio processing, etc.).
- Wireless microphone, e.g. to act as a table microphone streaming to the wearable device providing an improvement in SNR in challenging listening situations. The position of the non-wearable device can be considered, so spatiality is preserved.

The provision of a user interface in the non-wearable device is advantageous because there is more physical space and the user can see the device when operating it (as opposed to the ear-worn devices, which are difficult to operate due to placement on the ears).

The transceiver circuitry providing the (low latency) wireless audio communication link may be configured to allow the at least one electric input signal, or a signal originating therefrom, to be transmitted from the wearable device to the non-wearable device. The transceiver circuitry may be configured to allow the processed version of said least one electric input signal (or a signal originating therefrom) to be transmitted from the non-wearable device to the wearable device. The transceiver circuitry may be configured to allow the at least one electric input signal or a processed version thereof to be exchanged between the wearable and non-wearable device. The transceiver circuitry may include an antenna or an inducive coil.

The term ‘low latency wireless link’ (or ‘low latency wireless audio communication link’) may in the present context be taken to mean a wireless link that has a latency that is less than 50% of the total delay of the hearing aid system from input to the at least one input transducer to output of the output transducer, e.g. lower than the processing delay of the processor. The term ‘low latency wireless link’ (or ‘low latency wireless audio communication link’) may in the present context be taken to mean a wireless link that has a latency that is less than 2 ms (e.g. from input to a transmitter in one device to output of a receiver in another device).

The transceiver circuitry may be configured to provide that the (low latency) wireless audio communication link has a latency below 4 ms, e.g. below 2 ms. The transceiver circuitry may be configured to provide that the delay from the input to the (transmitter part of the) transceiver circuitry of the wearable device to the output of the (receiver part of the) transceiver circuitry of the non-wearable device is below 2 ms. Similarly, the transceiver circuitry may be configured to provide that the delay from the input to the (transmitter part of the) transceiver circuitry of the non-wearable device to the output of the (receiver part of the) transceiver circuitry of the wearable device is below 2 ms.

The hearing aid system may be configured to provide that the latency for

- transmission of the at least one electric signal or a signal derived therefrom to the non-wearable device,
- processing in the processor of the non-wearable device, and transmission of a processed signal (based on the at least one electric signal, etc.) to the wearable device, is below 8 ms, such as below 6 ms, such as below 5 ms in total.

The communication link may be based on a short-range wireless communication protocol, e.g. Bluetooth (BT/BLE) or similar technology, or Ultra Wideband Technology (UWB). Using a wireless communication link providing low audio latency makes it feasible to transfer audio from an ear mounted part of a hearing aid to an external device and back again, e.g. (from/to) an earpiece ('the wearable device') to an external device with more processing power than the earpiece, e.g. a smartphone or other wearable device with communication capability ('the further wearable device') or to a stationary device, e.g. comprising or connected to a large power supply, e.g. the electricity network ('the non-stationary device').

Functionality of UWB or BT/BLE may be used to localize the hearing aid system (and or earpieces of the hearing aid system) at given location (e.g. a location in a room where the user is currently situated). This may e.g. be utilized to enhance (or attenuate) sound from nearby (e.g. known) sound sources.

The wearable device may comprise a processor configured to—at least in said device mode of operation—process said at least one electric input signal, or a signal originating therefrom, to at least partially compensate for the hearing impairment of the user and to provide said processed version thereof. Thereby it is achieved that the wearable device can still function as a hearing aid, if/when the user gets out of transmission range of the non-wearable (stationary) device comprising the (external) processor (e.g. when the user moves away from where the non-wearable device is located, e.g. when the user leaves home).

The hearing aid system may comprise a further wearable device comprising a processor allowing—at least in said device mode of operation—processing of the at least one electric input signal and configured to provide the processed version thereof, and wherein the hearing aid system comprises appropriate transceiver circuitry allowing said at least one electric input signal, or a signal originating therefrom, to be transmitted from the wearable device to the further wearable device and allowing said processed version thereof to be transmitted from the further wearable device to the wearable device. Thereby essential processing tasks of a hearing aid (e.g. compensating for a user's hearing impairment) can be taken over by a processor of the further wearable device. The further wearable device may comprise an energy source that is larger than the energy source of the wearable device, e.g. an earpiece. The further wearable device may e.g. be a smartphone, or a smart watch, or a remote control running a dedicated processing APP.

The APP may be configured to receive updated processing parameters of the further wearable device from the non-wearable device when connected to it. The APP may be configured to run a subset of the processing algorithms (or less complicated versions of the processing algorithms) of the processor of the non-wearable device.

Advantages of using the processor (e.g. an APP) of the further wearable device, e.g. a smartphone or a smartwatch) when out of range of the non-wearable device is that:

The user is unlikely to forget the smartphone, or to forget to charge it.

The smartphone (or smartwatch) already has access to the internet and/or is or may be connected to a local WiFi.

The hearing aid system may comprise an interface to a data network, e.g. the internet. The non-wearable device may comprise the interface to the data network (cf. e.g. data interface (DIF) in FIG. 1A, 1C, etc.). The interface to the data network may be a (wide-band, fast (>100 Mb/s)) cable borne connection. Thereby software updates from remote servers may be accessible to the non-wearable device and from there distributed to relevant devices in communication with the non-wearable device, e.g. the wearable device (e.g. a hearing aid) and the further wearable device (e.g. a smartphone). Further, processing heavy tasks, e.g. related to artificial intelligence (e.g. neural network processing, etc.), may be performed on remote servers (e.g. located 'in the cloud').

The hearing aid system may be configured to support at least two different modes of operation, e.g. a first system mode of operation, and a second device mode of operation. The hearing system may be configured to provide that—in the system mode of operation—the at least one electric input signal, or a signal originating therefrom, is processed by the processor of the non-wearable device. The hearing system may be configured to provide that—in the device mode of operation—the at least one electric input signal, or a signal originating therefrom, is processed by the processor of the wearable device (or by a processor of a further wearable device). The hearing system may be configured to provide that—in the system mode of operation—the at least one electric input signal captured by the input stage of the wearable device is transmitted to the non-wearable device and processed by the processor of the non-wearable device, and the processed version of the at least one electric input signal is transmitted to the wearable device and presented to the user via the output stage of the wearable device. The hearing system may be configured to provide that—in the device mode of operation—the at least one electric input signal captured by the input stage of the wearable device is processed by the processor of the non-wearable device (or by a processor of a further wearable device) and the thus processed signal is presented to the user via the output stage of the wearable device. In the device mode of operation, the wearable device may function as a 'stand-alone hearing aid' without being in communication with the non-wearable device of the hearing aid system. The system mode of operation may e.g. be (defined by and/or) used when the user of the hearing system (and thus the wearable device) is sufficiently close to the non-wearable device to allow the wireless audio communication link between them to be established or maintained (e.g. within a range of operation of the wireless audio communication link, e.g. with an acceptable quality and/or power consumption, e.g. in the wearable device). The device mode of operation may e.g. be (defined by and/or) used when the wearable device is out of reach of the non-wearable device (e.g. when the wireless audio communication link cannot be established or maintained with an acceptable quality and/or power consumption, e.g. in the wearable device). The system mode of operation may e.g. be (defined by and/or) used when the user of the hearing system (and thus the wearable device) is within a certain distance of the non-wearable device, e.g. in the same room. The system mode of operation may e.g. be activated by the non-wearable device (e.g. by detecting the presence of the wearable device being within a range of operation of a communication link (e.g. the wireless audio communication link, or a separate (e.g. longer range, more narrow band) data communication link). When within range of operation of the separate data communication link, the external processor of the non-wearable device may receive data from the wearable device (e.g. earpiece). This data is processed in the external non-wearable device and processed data are sent back to the earpiece. The data can be a processed audio stream and/or it can be recommendations for settings to be used by the earpiece (e.g. to be able to deal with the enhanced processing capabilities of the system mode of operation). Other modes of operation of the hearing aid system may be supported, e.g. a 'partner' or 'table microphone' mode of operation, where a microphone or a microphone array of the non-wearable device (the at least one further input transducers) is used as for picking up sound from sound sources located near the non-wearable device ('table microphone'-function). The sound picked up by the 'table microphone' may be processed in the processor (PRO) and forwarded to the wearable device for presentation to the user (e.g. alone or in combination, e.g. a weighted combination, with sound picked up by the microphones of the wearable device). Another mode of operation of the hearing aid system may include a 'TV-mode of operation', where sound from an audio interface to a TV (or other audio delivery device) may be transmitted from the non-wearable device to the wearable device for presentation to the user. Another mode of operation of the hearing aid system may include a 'charging-mode of operation', wherein a battery or batteries of the wearable device(s) is/are recharged. Some of the above modes may be simultaneously supported, e.g. 'system mode' and 'partner' or 'table microphone' mode, 'system mode' and 'TV mode', and 'system mode' and 'charging mode'.

The device mode of operation may e.g. be (defined by and/or) used when the user of the hearing system (and thus the wearable device) is outside a certain distance of the non-wearable device, e.g. not in the same room, e.g. detected by one or more sensors or detectors. The performance of the hearing aid system may be lower in the device mode than in the system mode of operation. The mode of operation of the hearing aid system may e.g. be determined (e.g. entered and/or left) by the user via a user interface, e.g. implemented as an APP of smartphone or other wearable device in communication with the wearable device and/or the non-wearable device, cf. FIG. 4B.

The hearing aid system may comprise a mode controller for providing a mode control signal for controlling whether or not the hearing aid system is in the system mode or in the device mode of operation.

The hearing aid system may be configured to establish said wireless audio communication link between said wearable device and said non-wearable device in dependence of said mode control signal. The hearing aid system may be configured to activate the wireless audio communication link when the hearing aid system is in the system mode of operation. The hearing aid system may be configured to enter the system mode of operation when the wireless audio communication link can be established. The hearing aid system may be configured to enter the device mode of operation when the wireless audio communication link cannot be established (or no longer be maintained, e.g. maintained with an acceptable signal quality).

Even when in the system mode of operation, the hearing aid system may be configured to refrain from using the wireless connection between the wearable device and the non-wearable device, e.g. to give a longer battery use time in the wearable device, if relevant, e.g. based on a calendar function (e.g. shared with a smartphone), or requested from a user interface (e.g. of a smartphone (or other portable device)). In such case, the wearable device may be configured to provide a basic hearing aid functionality, without being connected to the non-wearable device, i.e. effectively be in a device mode of operation (cf. e.g. 'device mode' in FIG. 1B).

When the hearing aid system is in the system mode of operation, personalized voice shaping of persons around the user may be provided, e.g. based on exchange of information with smartphones carried by said persons (e.g. provided with UWB/BLE wireless technology). The persons around the user may be identified based on information of the smartphone and localized, e.g. using functionality of the UWB/BLE wireless technology. When identification and location of a person around the user is available, personalized voice shaping can be applied to voice signals picked up by the hearing aid system before being presented to the user. Further, a microphone of the smartphone of a person around the user may be used to pick up the voice of said person, and the voice may be transmitted to the hearing aid system (e.g. to the non-wearable device) of the user and presented to the user via the output transducer of the wearable device.

The hearing aid system may comprise a data link to allow the exchange of control signals between the wearable and non-wearable devices. The data link may be a low power link (e.g. based on Bluetooth low energy) that can be used to repeatedly check the presence of the other device, e.g. initiated by the non-wearable device. The data link may be configured to have a longer range of operation than the wireless audio communication link. Thereby the presence of the wearable device, e.g. a hearing aid (or an earpiece of the hearing aid), can be determined before an audio link with acceptable quality and/or power consumption can be established between the wearable and non-wearable devices.

The hearing aid system may be configured to change settings of the wearable device according to a present mode of operation. The processor of the non-wearable device may be configured to transmit settings for the wearable device, at least for use in a system mode of operation, to the wearable device via the wireless audio communication link. The settings may include the configuration of a forward path of the wearable device (the forward path being responsible for processing of the electric input signals representing sound). The settings of the system mode of operation may include enabling a transmission of the electric input signal(s) or a signal derived therefrom (e.g. a spatially filtered (beamformed) signal) to the non-wearable device for processing by the processor of the non-wearable device. The settings of the system mode of operation may include enabling reception of an audio signal from the non-wearable device via the wireless audio communication link. The audio signal received by the wearable device may e.g. comprise the processed version of the at least one electric input signal of the wearable device(s) and/or an audio signal provided by the non-wearable device or from a device in communication with the non-wearable device, e.g. picked up by a microphone or provided by another audio source, e.g. an audio delivery device, e.g. a TV). The settings of the system mode of operation may include enabling presentation of the audio signal received from the non-wearable device via the to the output transducer of the wearable device. The settings of the system mode of operation for the wearable device may be stored in the wearable device and e.g. applied in dependence of a mode control signal.

The hearing aid system may be configured to extract directional information of current sound sources in the environment using one or more microphones of the non-wearable device or connected to the non-wearable device (and/or using functionality of the wireless audio communication link). The directional information may e.g. be used to apply spatial cues to the audio stream. When audio is streamed from the external processor, it is processed in such a way that the sound sources from which the streamed sound originate are placed correct spatially in the environment of the user. If person 1 is standing to the left of the user and person 2 is standing to the right, it will sound like voice from person 1 is coming from left side and voice from person 2 is coming from right side despite the sound being streamed from the external processor.

The wearable device may be constituted by or comprise a hearing aid, e.g. an air-conduction type hearing aid, a bone-conduction type hearing aid, a cochlear implant type hearing aid, or a combination thereof.

The hearing aid system may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing aid may comprise a signal processor for enhancing the input signals and providing a processed output signal.

The wearable part of the hearing aid system comprises an output stage for providing a stimulus perceived by the user as an acoustic signal based on a processed electric signal. The output stage may comprise an output transducer. The output transducer may comprise a number of electrodes of a cochlear implant (for a CI type hearing aid) or a vibrator of a bone conducting hearing aid. The output transducer may comprise a receiver (loudspeaker) for providing the stimulus as an acoustic signal to the user (e.g. in an acoustic (air conduction based) hearing aid). The output transducer may comprise a vibrator for providing the stimulus as mechanical vibration of a skull bone to the user (e.g. in a bone-attached or bone-anchored hearing aid).

The wearable part of the hearing aid system comprises an input stage for providing an electric input signal representing sound. The input stage may comprise an input transducer, e.g. a microphone, for converting an input sound to an electric input signal. The input stage may comprise a wireless receiver for receiving a wireless signal comprising or representing sound and for providing an electric input signal representing said sound. The wireless receiver may e.g. be configured to receive an electromagnetic signal in the radio frequency range (3 kHz to 300 GHz). The wireless receiver may e.g. be configured to receive an electromagnetic signal in a frequency range of light (e.g. infrared light 300 GHz to 430 THz, or visible light, e.g. 430 THz to 770 THz).

The hearing aid system may comprise a directional system, e.g. a directional microphone system, adapted to spatially filter sounds from the environment, and thereby enhance a target acoustic source relative to a multitude of acoustic sources in the local environment of the user wearing the hearing aid. The directional system may be adapted to detect (such as adaptively detect) from which direction a particular part of the microphone signal originates. This can be achieved in various different ways as e.g. described in the prior art. In hearing aids, a microphone array beamformer is often used for spatially attenuating background noise sources. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

The wearable and non-wearable devices may each comprise antenna and transceiver circuitry (e.g. a wireless receiver and transmitter) for wirelessly receiving and transmitting, respectively, an electric input signal, or a signal originating therefrom, e.g. a processed version thereof from another device. Preferably, frequencies used to establish a communication link between the hearing aid and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range (Bluetooth, WiFi) or in the 5.8 GHz range (WiFi) or in the range from 3.1 GHz to 10.6 GHz (UWB), or in the 60 GHz range (ISM=Industrial, Scientific and Medical, such standardized ranges being e.g. defined by the International Telecommunication Union, ITU). The wireless link may be based on a standardized or proprietary technology. The wireless link may e.g. be based on Bluetooth technology (e.g. Bluetooth Low-Energy technology) or on ultra-wide-band (UWB) technology.

The wearable device, e.g. an earpiece, may have a weight of less than 20 g, or less than 10 g.

The hearing aid system may be configured to operate in different modes, e.g. a normal mode and one or more specific modes, e.g. selectable by a user, or automatically selectable. A mode of operation may be optimized to a specific acoustic situation or environment. A mode of operation may include a low-power mode, where functionality of the hearing aid is reduced (e.g. to save power), e.g. to disable wireless communication, and/or to disable specific features of the hearing aid.

The hearing aid system may comprise a number of detectors configured to provide status signals relating to a current physical environment of the hearing aid (e.g. the current acoustic environment), and/or to a current state of the user wearing the hearing aid, and/or to a current state or mode of operation of the hearing aid. Alternatively or additionally, one or more detectors may form part of an external device in communication (e.g. wirelessly) with the hearing aid. An external device may e.g. comprise another hearing aid, a remote control, and audio delivery device, a telephone (e.g. a smartphone), an external sensor, etc. The external device may e.g. be connected to the non-wearable device. The one or more detectors may comprise a microphone. One or more microphone(s) of the external device(s) may function as external microphone(s), e.g. permanently fixed to the walls of a room (or resting on a support, e.g. a table in a room or other location), which may give a better signal (from a particular sound source) than the microphone(s) of the hearing aid.

Other (fixed) detectors may be PIR detectors (PIR=Passive InfraRed) or cameras that detect persons in a room may be in communication with the non-wearable device. This enables the non-wearable device to better place speakers in the users' acoustical landscape. This may enable better speaker separation, and/or modifying the sound transmitted to the hearing aid to give directional cues, or other processing, like camera-based mouth- or lip-reading to enhance speaker separation or noise reduction". In addition or as an alternative to PIR, or camera detection, other forms, like ultrasound, UWB, or radar detection, are available, which may thereby provide a further improved hearing aid system.

One or more of the number of detectors may operate on the full band signal (time domain). One or more of the number of detectors may operate on band split signals ((time-) frequency domain), e.g. in a limited number of frequency bands.

The number of detectors may comprise a level detector for estimating a current level of a signal of the forward path.

The detector may be configured to decide whether the current level of a signal of the forward path is above or below a given (L-)threshold value. The level detector may operate on the full band signal (time domain). The level detector may operate on band split signals ((time-) frequency domain).

The hearing aid system may comprise a voice activity detector (VAD) for estimating whether or not (or with what probability) an input signal comprises a voice signal (at a given point in time). A voice signal may in the present context be taken to include a speech signal from a human being. It may also include other forms of utterances generated by the human speech system (e.g. singing). The voice activity detector may be adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. natural or artificially generated noise). The voice activity detector may be adapted to detect as a VOICE also the user's own voice. Alternatively, the voice activity detector may be adapted to exclude a user's own voice from the detection of a VOICE.

The hearing aid system may comprise an own voice detector for estimating whether or not (or with what probability) a given input sound (e.g. a voice, e.g. speech) originates from the voice of the user of the system. A microphone system of the hearing aid may be adapted to be able to differentiate between a user's own voice and another person's voice and possibly from NON-voice sounds.

The number of detectors may comprise a movement detector, e.g. an acceleration sensor. The movement detector may be configured to detect movement of the user's facial muscles and/or bones, e.g. due to speech or chewing (e.g. jaw movement) and to provide a detector signal indicative thereof.

The hearing aid system may comprise a classifier configured to classify the current situation (e.g. acoustic situation) based on input signals from (at least some of) the detectors, and possibly other inputs as well. In the present context 'a current situation' may be taken to be defined by one or more of a) the physical environment (e.g. including the current electromagnetic environment, e.g. the occurrence of electromagnetic signals (e.g. comprising audio and/or control signals) intended or not intended for reception by the hearing aid, or other properties of the current environment than acoustic);
b) the current acoustic situation (input level, feedback, etc.), and
c) the current mode or state of the user (movement, temperature, cognitive load, etc.);
d) the current mode or state of the hearing aid (program selected, time elapsed since last user interaction, etc.) and/or of another device in communication with the hearing aid.

The classifier may be based on or comprise a neural network, e.g. a trained neural network. The classifier may be focused on the acoustic environment.

The hearing aid system may further comprise other relevant functionality for the application in question, e.g. compression, noise reduction, feedback control, etc.

The hearing aid system may comprise a hearing instrument, e.g. a hearing instrument adapted for being located at the ear or fully or partially in the ear canal of a user, a headset, an earphone, an ear protection device or a combination thereof. The hearing aid system may e.g. comprise a speakerphone (comprising a number of input transducers and a number of output transducers, e.g. for use in an audio conference situation), e.g. comprising a beamformer filter, e.g. providing multiple beamforming capabilities.

Use:

In an aspect, use of a hearing aid system as described above, in the 'detailed description of embodiments' and in the claims, is moreover provided. Use may be provided in a system comprising audio distribution. Use may be provided in a system comprising one or more hearing aids (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

An APP:

In a further aspect, a non-transitory application, termed an APP, is furthermore provided by the present disclosure. The APP comprises executable instructions configured to be executed on an auxiliary device to implement a user interface for a hearing aid or a hearing system as described above in the 'detailed description of embodiments', and in the claims. The APP may be configured to run on a cellular phone, e.g. a smartphone, or on another portable device allowing communication with said hearing aid or said hearing system. The APP may be adapted to allow a user to configure a hearing aid system according to the present disclosure, e.g. to determine a current mode of operation of the system (e.g. to activate of deactivate 'device mode' of operation (where audio processing is performed in the wearable device) and a 'system mode' of operation (where audio processing is performed in the wearable device). The APP may be adapted to allow a user to configure input transducers (e.g. microphones) of the hearing aid system, e.g. whether or not a given input transducer is active at a given point in time. The APP may be adapted to allow a user to configure which of the input transducers (e.g. microphones) of the hearing aid system (e.g. of the wearable and non-wearable devices) that are used in beamforming at a given point in time.

Definitions:

In the present context, a hearing aid, e.g. a hearing instrument, refers to a device, which is adapted to improve, augment and/or protect the hearing capability of a user by receiving acoustic signals from the user's surroundings, generating corresponding audio signals, possibly modifying the audio signals and providing the possibly modified audio signals as audible signals to at least one of the user's ears. Such audible signals may e.g. be provided in the form of acoustic signals radiated into the user's outer ears, acoustic signals transferred as mechanical vibrations to the user's inner ears through the bone structure of the user's head and/or through parts of the middle ear as well as electric signals transferred directly or indirectly to the cochlear nerve of the user.

The hearing aid may be configured to be worn in any known way, e.g. as a unit arranged behind the ear with a tube leading radiated acoustic signals into the ear canal or with an output transducer, e.g. a loudspeaker, arranged close to or in the ear canal, as a unit entirely or partly arranged in the pinna and/or in the ear canal, as a unit, e.g. a vibrator, attached to a fixture implanted into the skull bone, as an attachable, or entirely or partly implanted, unit, etc. The hearing aid may comprise a single unit or several units communicating (e.g. acoustically, electrically or optically) with each other. The loudspeaker may be arranged in a housing together with other components of the hearing aid or may be an external unit in itself (possibly in combination with a flexible guiding element, e.g. a dome-like element).

More generally, a hearing aid comprises an input transducer for receiving an acoustic signal from a user's surroundings and providing a corresponding input audio signal and/or a receiver for electronically (i.e. wired or wirelessly) receiving an input audio signal, a (typically configurable) signal processing circuit (e.g. a signal processor, e.g. comprising a configurable (programmable) processor, e.g. a digital signal processor) for processing the input audio signal and an input stage for providing an audible signal to the user in dependence on the processed audio signal. The signal processor may be adapted to process the input signal in the time domain or in a number of frequency bands. In some hearing aids, an amplifier and/or compressor may constitute the signal processing circuit. The signal processing circuit typically comprises one or more (integrated or separate) memory elements for executing programs and/or for storing parameters used (or potentially used) in the processing and/or for storing information relevant for the function of the hearing aid and/or for storing information (e.g. processed information, e.g. provided by the signal processing circuit), e.g. for use in connection with an interface to a user and/or an interface to a programming device. In some hearing aids, the input stage may comprise an output transducer, such as e.g. a loudspeaker for providing an air-borne acoustic signal or a vibrator for providing a structure-borne or liquid-borne acoustic signal. In some hearing aids, the input stage may comprise one or more output electrodes for providing electric signals (e.g. to a multi-electrode array) for electrically stimulating the cochlear nerve (cochlear implant type hearing aid).

In some hearing aids, the vibrator may be adapted to provide a structure-borne acoustic signal transcutaneously or percutaneously to the skull bone. In some hearing aids, the vibrator may be implanted in the middle ear and/or in the inner ear. In some hearing aids, the vibrator may be adapted to provide a structure-borne acoustic signal to a middle-ear bone and/or to the cochlea. In some hearing aids, the vibrator may be adapted to provide a liquid-borne acoustic signal to the cochlear liquid, e.g. through the oval window. In some hearing aids, the output electrodes may be implanted in the cochlea or on the inside of the skull bone and may be adapted to provide the electric signals to the hair cells of the cochlea, to one or more hearing nerves, to the auditory brainstem, to the auditory midbrain, to the auditory cortex and/or to other parts of the cerebral cortex.

A hearing aid may be adapted to a particular user's needs, e.g. a hearing impairment. A configurable signal processing circuit of the hearing aid may be adapted to apply a frequency and level dependent compressive amplification of an input signal. A customized frequency and level dependent gain (amplification or compression) may be determined in a fitting process by a fitting system based on a user's hearing data, e.g. an audiogram, using a fitting rationale (e.g. adapted to speech). The frequency and level dependent gain may e.g. be embodied in processing parameters, e.g. uploaded to the hearing aid via an interface to a programming device (fitting system) and used by a processing algorithm executed by the configurable signal processing circuit of the hearing aid.

A 'hearing system' refers to a system comprising one or two hearing aids, and a 'binaural hearing system' refers to a system comprising two hearing aids and being adapted to cooperatively provide audible signals to both of the user's ears. Hearing systems or binaural hearing systems may further comprise one or more 'auxiliary devices', which communicate with the hearing aid(s) and affect and/or benefit from the function of the hearing aid(s). Such auxiliary devices may include at least one of a remote control, a remote microphone, an audio gateway device, an entertainment device, e.g. a music player, a wireless communication device, e.g. a mobile phone (such as a smartphone) or a tablet or another device, e.g. comprising a graphical interface. Hearing aids, hearing systems or binaural hearing systems may e.g. be used for compensating for a hearing-impaired person's loss of hearing capability, augmenting or protecting a normal-hearing person's hearing capability and/or conveying electronic audio signals to a person. Hearing aids or hearing systems may e.g. form part of or interact with public-address systems, active ear protection systems, handsfree telephone systems, car audio systems, entertainment (e.g. TV, music playing or karaoke) systems, teleconferencing systems, classroom amplification systems, etc.

Embodiments of the disclosure may e.g. be useful in applications such as flexible hearing aid systems with a situation dependent configurable processing power.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

Figure 1A:
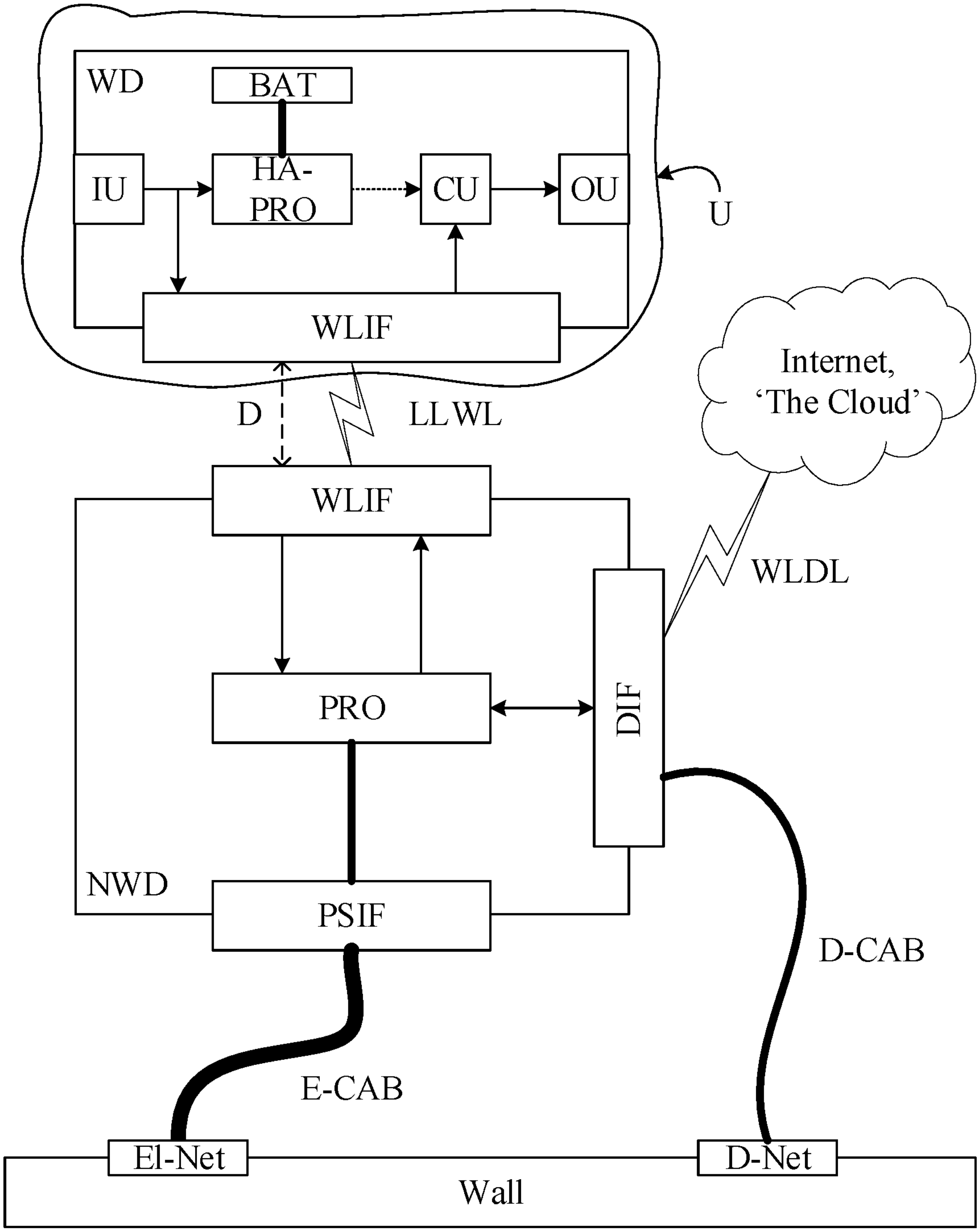
FIG. 1A shows an embodiment of a hearing aid system according to the present disclosure in a 'system mode' of operation.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of hearing aids. A hearing aid has limited computing resources due to its small size. Artificial Intelligence (AI), Deep Learning (Deep Neural Networks (DNN)) and networking may enhance hearing but cannot be realized in state-of-the-art hearing aids. Heat dissipation, physical space and battery life all constrain hearing aid functionality.

Due to improved data transmission technology, it is now possible to (realistically) move the audio processing from the hearing aid to an external processor. The hearing aid can stream its microphone signal(s) to the external processor and receive an audio signal ready for presentation to the user via the hearing aid receiver (e.g. a loudspeaker).

By combining a hearing aid with an external processing unit, computing resources are no longer limiting for advanced processing functionality (e.g. using AI, DNN for speech recognition, etc.).

A hearing system according to the present disclosure may comprise some of the following elements:

- An external processing device (also termed the non-wearable device in the present disclosure), e.g. connected to a mains power supply (e.g. 110V/220V/240 V AC at 50 Hz or 60 Hz).
- Super-low latency audio streaming between an ear-worn part of a hearing aid (also termed the 'wearable device' in the present disclosure) and the external processing device (termed the 'non-wearable device' in the present disclosure) and other devices.
- The external processing device may comprise a data network interface allowing connection to the internet, e.g. for software updates and AI/DNN updates.
- The external processing device may work as an external sound processor with vast computing resources (compared to the hearing aid) and support for AI-technology, e.g. deep learning.
- The external processing device may provide interfacing to external microphones, e.g.

placed around a house (e.g. the user's house or typical office surroundings, etc.) to provide extra speech understanding, sound localization, etc.

- The external processing device may comprise an audio interface for the hearing aid to an audio delivery device, e.g. a TV.
- The external processing device may comprise interfaces to TV-Video and subtitles to capture meta-data for sound enhancements.
- The external processing device may comprise interfaces to external video cameras for sound enhancements.
- The external processing device may comprise an interface to charging of hearing aid batteries.
- The external processing device may comprise multiple internal microphones (e.g. a microphone array). The external device may stream the audio from the internal microphones to the hearing devices (or combined with electric input signals received from the wearable device) for improved signal quality (e.g. signal to noise ratio (SNR), e.g. using beamforming). The microphones may be automatically activated based on information from the hearing aid or be activated by the user (e.g. via a user interface).

The non-wearable device may be a multi-function product. The non-wearable device may comprise an accessory device to a hearing aid. The non-wearable device may comprise or consist of a charging station (e.g. a contact charger or a wireless charger) for the hearing aid (e.g. 'the wearable device'). The wireless charger may provide enhanced processing capabilities, that can augment the existing hearing system when "connected". Specifically, the charging station may be enhanced with a DSP chip optimized for audio processing, and/or Neural Network applications. The charging station may further comprise a microphone (or a microphone array) and networking (e.g. WiFi) capabilities, e.g. providing access to servers on the Internet (cloud computing).

The extended capabilities may comprise:

- A voice interface, e.g. using a specific processor, e.g. an ARM chip, capable to solve more complex key word recognition tasks than what is possible with a normal hearing aid DSP chip.
- The non-wearable device may function as a WiFi hub that will connect the wearable device (e.g. the hearing aid) to the internet (or the cloud), e.g. using Bluetooth Low Energy (BLE) or UWB (between the wearable and non-wearable devices). Thereby an even better neural network processing than when processed offline may be provided.

An onboard microphone (or microphone array) in the non-wearable device may be used to provide table microphone functionality.

An onboard microphone (or microphone array) in the non-wearable device may be used to provide acoustic environment classification (without the need for an APP or smart phone).

In the following (e.g. FIG. 1A, 1B, 1C, 2A, 2B, 3), different configurations of a hearing aid system according to the present disclosure are shown, wherein WD represents a Wearable Device, e.g. a hearing aid, NWD represents a Non-Wearable Device, e.g. a TV-sound interface device, or other 'stationary' device, e.g. a charger.

FWD represents a Further Wearable Device, e.g. a telephone or other portable processing device, e.g. a remote control device for the hearing aid system.

FIG. 1A shows an embodiment of a hearing aid system according to the present disclosure in a 'system mode of operation'. The hearing aid system may be configured to compensate for a hearing impairment of a user. The hearing aid system comprises a wearable device (WD), e.g. a hearing aid, or an earpiece of a hearing aid, adapted for being worn by the user, and a non-wearable device (NWD). The user is indicated by the solid enclosure (denoted U) around the wearable device (WD).

The wearable device (WD), e.g. a hearing aid, comprises a forward path for processing an audio signal from an input stage (IU) to an input stage (OU). The input stage (IU) comprises at least one input transducer (e.g. a microphone) for converting sound around the user to at least one electric input signal representing the sound. The input stage (OU) is configured to provide stimuli representative of a processed version of the least one electric input signal to the user, where the stimuli are perceivable by the user as sound. The wearable device (WD) comprises a local energy source (e.g. a battery, BAT) for energizing electronic components of the device.

The non-wearable device (NWD) comprises a processor (PRO) and a power supply interface (PSIF) for providing power to the processor (and to possible other electronic components of the non-wearable device). The processor (PRO) of the non-wearable device (NWD) comprises an audio processor configured to process the at least one electric input signal from the wearable device, or a signal originating therefrom, to at least partially compensate for the hearing impairment of the user and to provide a processed version of the at least one electric input signal.

The wearable device (WD) and the non-wearable device (NWD) comprise respective wireless interfaces (WLIF) comprising appropriate transceiver circuitry for establishing a wireless audio communication link (LLWL) between them. The transceiver circuitry may include an antenna as appropriate for the application in question. The wireless audio communication link (LLWL) may be a low latency wireless link, e.g. based on Bluetooth technology or ultra-wide band technology (UWB). The latency of the wireless audio communication link (LLWL), including the circuitry associated with transmission and reception of the audio signal to/from the non-wearable device, is configured to be sufficiently low to allow at least a part of the signal processing of the at least one electric input signal to be performed in the non-wearable device (NWD), while still presenting the thus processed signal to the user via the input stage (OU) of the wearable device (WD) with an acceptable delay. The hearing aid system (in the system mode of operation) is configured to provide that the latency of the signal processing path from input to output of the wearable device (WD), including wireless audio communication link (LLWL) and processing in the non-wearable device (NWD), is below 10 ms, e.g. below 8 ms. A latency below 10 ms is preferable because of possible interference between acoustically propagated sound at the eardrum and the output sound from the output unit (OU, e.g. a loudspeaker) of the wearable device (WD). A latency of more than 10 ms may result in an increasingly "roomy" sound-effect like in a church (like reverberation). Even more latency gives an "echo"/double sound effect. The physical distance between the user (i.e. the wearable device) and the non-wearable device is indicated as D. In the system mode of operation, the wireless audio communication link (LLWL) is configured to exhibit an acceptable quality (e.g. bit error rate) and latency. The wireless audio communication link (LLWL) may e.g. be configured to have a functional range below the distance (transmission range) $D_{LLWL}$. The distance $D_{LLWL}$ may e.g. be larger than 5 m, e.g. less than 50 m, such as less than 20 m, e.g. less than 10 m (e.g. dependent on blocking objects between the wearable and the non-wearable devices). In the system mode of operation, $D \le D_{LLWL}$. The transmission range $D_{LLWL}$ may be dependent on a power setting in the transceiver circuitry, e.g. limited by power consumption of the wearable device (to keep it at an acceptable level considering the capacity of the local energy source of the wearable device, e.g. a battery, BAT). The transmission range from the non-wearable device to the wearable device may be larger than the transmission range from the wearable device to the non-wearable device (e.g. achieved by controlling a maximum transmit power in the respective devices). The maximum physical distance D between the wearable device (WD) and the non-wearable device (NWD) in the system mode of operation may thus be controlled by a setting of the maximum transmit power in the transceiver of the wearable device.

The hearing aid system may comprise a further data link (or channel) between the wearable and non-wearable devices to allow the exchange of control signals between them. The data link may be a low power link (e.g. based on Bluetooth low energy) that can be used to repeatedly check the presence of the other device, e.g. initiated by the non-wearable device. The data link may be configured to have a longer range of operation than the wireless audio communication link (LLWL). Thereby the presence of the wearable device, e.g. a hearing aid, can be determined before an audio link with acceptable quality and/or power consumption can be established between the wearable and non-wearable devices. The further data link (or channel) may form part of the wireless audio communication link (LLWL).

The power supply interface (PSIF) of the non-wearable device (NWD) is electrically connected to an electricity network (El-Net, or other stable source of sufficient power to allow the non-wearable device to provide its full functionality). The electrical connection may comprise an electric cable (E-CAB). The non-wearable device, or a device which the non-wearable device is integrated with or form part of, may comprise a connector (e.g. a plug) for electrically connecting the device to the electricity network (e.g. via a socket, e.g. as shown in the embodiment of FIG. 1A, in a wall (Wall) of a house or apartment, e.g. in a living room or in an office of the user, U). The power supply interface (PSIF) may comprise a transformer of power from a (single phase voltage) of the electricity net (e.g. 220 Volt AC at 50 Hz) to a lower voltage. The power supply interface (PSIF) may further comprise an AC to DC converter to transform an AC voltage to a DC voltage, e.g. 12 Volt or 5 Volt or lower. The power supply interface (PSIF) may further comprise a DC to DC converter to generate DC-voltages appropriate for the various electronic components of the non-wearable device.

The non-wearable device (NWD) may e.g. comprise an interface (DIF) to a data network. The data interface (DIF) may e.g. comprise a cabled connection to the data network (D-Net), the data connection e.g. comprising a data cable (D-CAB) from the non-wearable device (NWD) and a connector (e.g. a plug-socket connector) in another device or in the wall (as illustrated in FIG. 1A, D-Net, Wall). The data interface (DIF) may e.g. comprise a wireless connection (WLDL) to the data network (denoted Internet, 'The Cloud' in FIG. 1A).

The wearable device (WD) may e.g. further comprise a processor (HA-PRO) configured to—at least in a device mode of operation—process the at least one electric input signal (from the input stage IU), or a signal originating therefrom, to at least partially compensate for the hearing impairment of the user and to provide a processed version thereof to the input stage (OU), e.g. via an intermediate unit, here combiner (CU), e.g. a selector or mixer. Thereby a full forward path for processing an input signal representing sound to stimuli perceivable as sound presented to the user is implemented in the wearable device (WD). Thereby, the wearable device can still function as a hearing aid, if/when the user (U) wearing the wearable device (WD) gets out of transmission range of the wireless audio communication link (LLWL) (i.e. if $D>D_{LLWL}$) and thus loses connection to the non-wearable (stationary) device (NWD) comprising the (external) processor (e.g. when the user moves away from where the non-wearable device is located). This can e.g. be when the user leaves home, as described in connection with FIG. 1B, 1C below. In the system mode of operation, however, where processing of the electric input signal(s) is performed in the non-wearable device (NWD), processing in the wearable device (WD) can be dispensed with (as indicated by the dotted output from the processor (HA-PRO) to the combiner (CU)). In the system mode of operation, the combiner (CU) receives its input from the processor (PRO) of the non-wearable device (NWD) and feeds it to the output stage (OU) of the wearable device (WD), e.g. for presentation to the user (U).

Figure 1B:
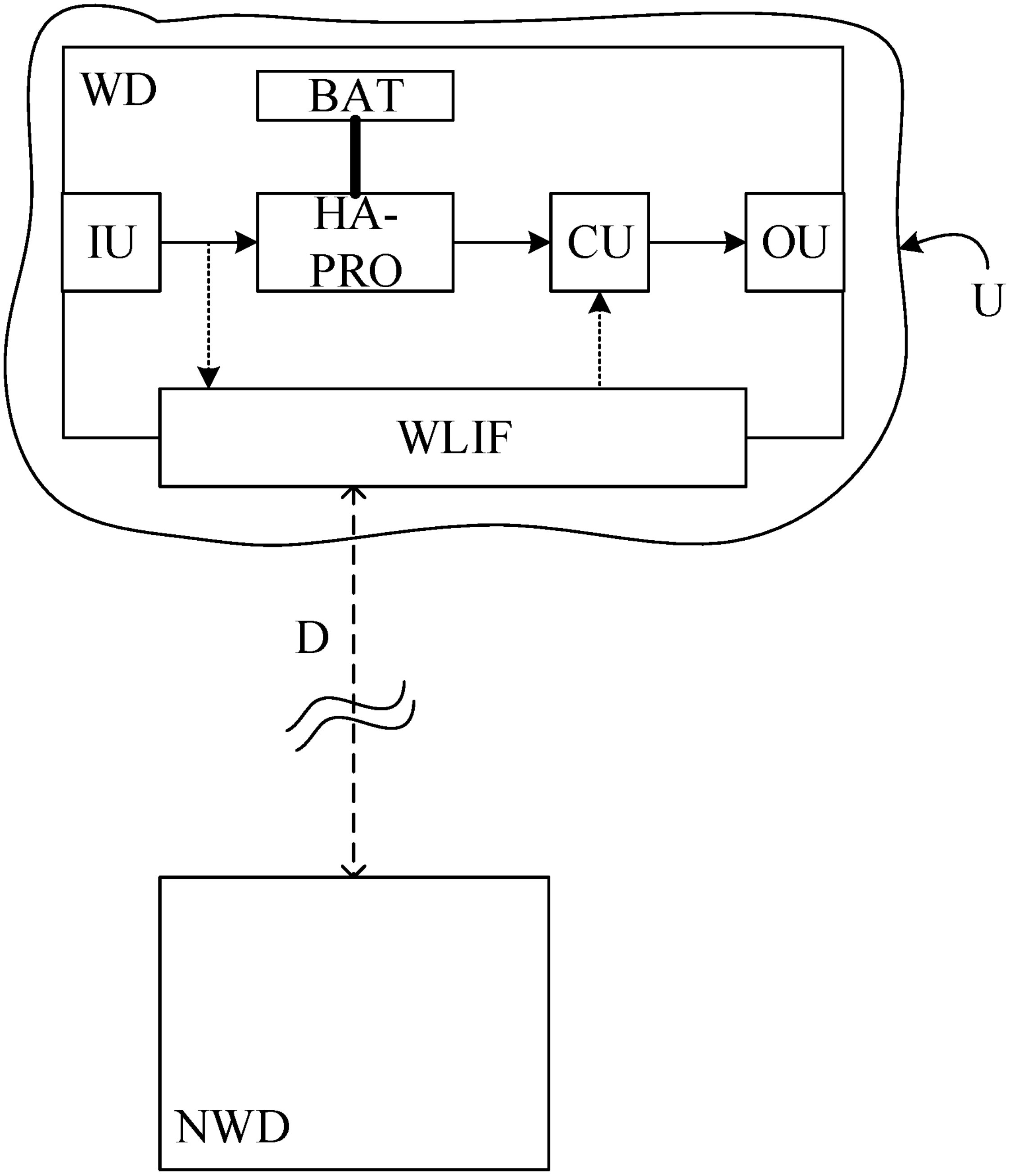
FIG. 1B shows an embodiment of a hearing aid system according to the present disclosure in a first 'device mode' of operation (a)
Figure 1C:
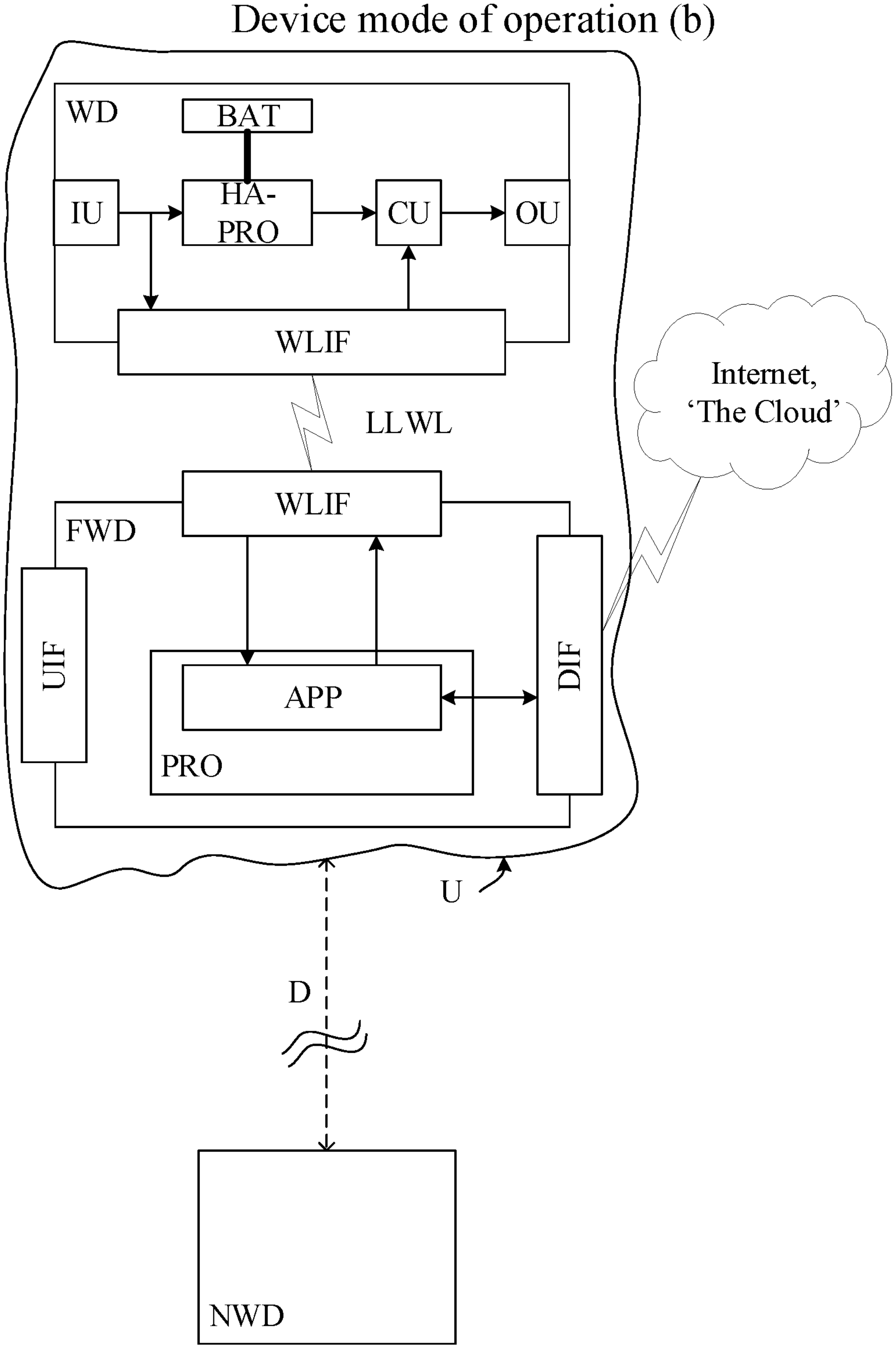
FIG. 1C shows an embodiment of a hearing aid system according to the present disclosure in a second 'device mode' of operation (b)

FIG. 1B and 1C show embodiments of a hearing aid system according to the present disclosure in respective first (a) and second (b) device modes of operation. In a 'device mode of operation', the user (U) wearing the wearable device (WD) may be out of transmission range ($D_{LLWL}$) of the wireless audio communication link (LLWL) (i.e. $D>D_{LLWL}$) and no connection to the non-wearable device (NWD) can be (or is) established.

In the first device mode of operation (a) illustrated in FIG. 1B, the audio processing is performed in the forward path of the wearable device (WD, i.e. mainly in the hearing aid processor HA-PRO). The processed signal from the hearing aid processor is fed to the combiner and further to the output stage (OU) for presentation to the user (U), e.g. via an output transducer, e.g. a loudspeaker. This is a normal function of a 'stand-alone hearing aid'. The non-wearable device (NWD) is schematically shown a distance D away, where $D>D_{LLWL}$, as indicated by the double waved symbol≈crossing the distance arrow (the two devices being thereby 'out of range of the link).

In the second device mode of operation (b) illustrated in FIG. 1C, the audio processing is performed in a further wearable device (FWD), e.g. a smartphone or a remote control device, or other wearable device (with increased processing power compared to the wearable device), in communication with the wearable device, e.g. a hearing aid. Again, as in FIG. 1A, 1B, the user is indicated by the solid enclosure denoted U circumventing the wearable device (WD) and (here additionally) the further wearable device (FWD). As in FIG. 1B, the non-wearable device (NWD) is schematically shown a distance D away from the wearable devices (WD, NWD), where $D>D_{LLWL}$, as indicated by the double waved symbol≈crossing the distance arrow (and thus out of reach of the non-wearable device), so that the communication between the wearable and non-wearable device is limited or absent.

The further wearable device (FWD) comprises a processor (PRO) allowing processing of the at least one electric input signal and providing the thus processed signal. The wearable device and the further wearable device each comprises appropriate transceiver circuitry allowing the at least one electric input signal, or a signal originating therefrom, to be transmitted from the wearable device to the further wearable device and allowing the thus processed signal to be transmitted from the further wearable device to the wearable device. The transceiver circuitry may be the same that is used to communicate with the non-wearable device, e.g. based on Bluetooth or UWB technology, or similar technology providing a low power, low latency wireless link. Thereby essential processing tasks of a hearing aid (e.g. compensating for a user's hearing impairment) can be taken over by a processor of the further wearable device, when the user is away from the non-wearable device. The further wearable device (FWD) may comprise an energy source (BAT, e.g. a battery, such as a rechargeable battery) that is larger than the energy source (BAT) of the wearable device, e.g. an earpiece of a hearing aid. The further wearable device may e.g. be a smartphone, or a smart watch, or a remote control running a dedicated application (APP) related to the wearable device, e.g. a hearing aid APP. The application may be configured to update its parameters from the non-wearable device when connected to it. The APP may be configured to run a subset of the processing algorithms (or less complicated versions of the processing algorithms) of the processor of the non-wearable device (NWD). The configuration of the hearing aid system may be performed via the APP, see e.g. FIG. 4B. The further wearable device (FWD) comprises an interface (DIF) to a data network, e.g. to the internet or 'The Cloud. The further wearable device may be configured to communicate with the non-wearable device via the data network. The further wearable device may be configured to inform the non-wearable device about its current location (e.g. via the APP, e.g. user-initiated). Thereby the non-wearable device may determine a current distance to the further wearable device (and thus to the wearable device). Based thereon, the non-wearable device may initiate the establishment of the low latency wireless link (LLWL) to the wearable device to enter the system mode of operation, where audio processing is performed in the non-wearable device (when the two devices are estimated to be within a transmission range of the low latency wireless link (LLWL). This represents a "handover" of processing from the wearable device (e.g. a hearing aid) to non-wearable device. It may happen when the non-wearable device and/or the further wearable device detects that the further wearable device (and therefore the user with the wearable device(s)) is in range to benefit from processing of the non-wearable device.

Figure 2A:
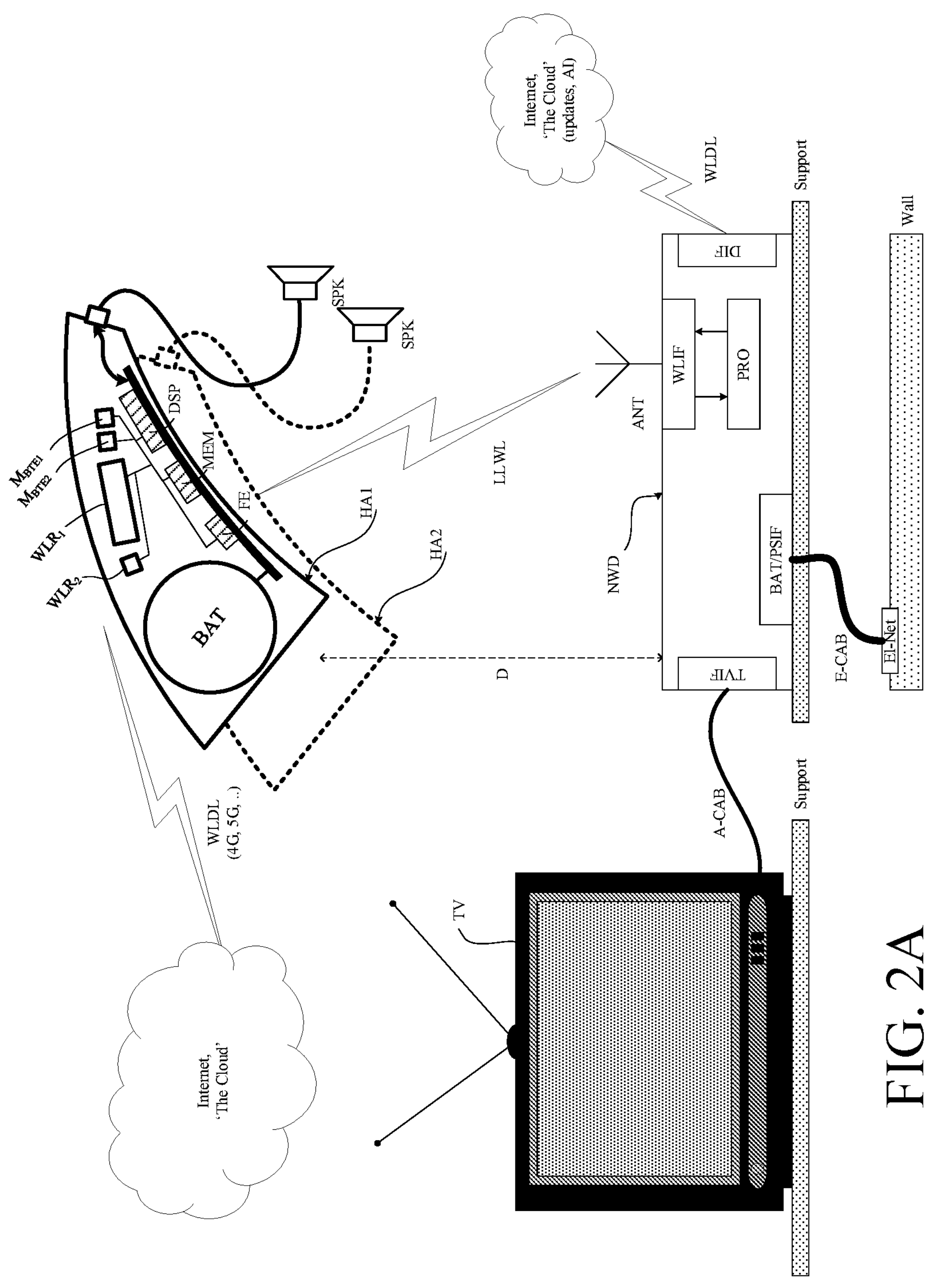
FIG. 2A shows a first use case of a hearing aid system according to the present disclosure, where the non-wearable device comprises an audio interface to a TV.

FIG. 2A shows a first use case of a hearing aid system according to the present disclosure, where the non-wearable device (NWD) comprises an audio interface (AIF), e.g. an interface to an audio or audio & video delivery device (TV), e.g. to a TV or other video device providing images accompanied by sound. FIG. 2A shows an embodiment of the hearing aid system wherein an external processor (PRO) of the non-wearable device (NWD) is connected to a TV set (TV), both located on a support structure (Support), e.g. a table or shelf (same or different). In the embodiment of FIG. 2A, the non-wearable device (NWD) provides an audio interface between a TV-set and the hearing aid system, e.g. to a 'monaural' hearing aid (HA1) or to a pair of hearing aids (HA1, HA2) of a binaural hearing aid system. In addition to the audio interface, the non-wearable device (NWD) comprises a processing interface to the hearing aid(s) of the hearing aid system allowing an enhanced processing capability for the hearing aid system to be provided, The non-wearable device comprises an audio interface (AIF) configured to receive an audio stream from an AV-device or system (here from the TV) and to stream the audio content from the AV-device (TV) to the wearable device, e.g. an earpiece, e.g. of a hearing aid (or hearing aids (HA1, HA2)). A low latency wireless link (LLWL) between the external processor (PRO) of the non-wearable device and the earpiece(s) exchanges data (including audio data). The electric input signals provided by input transducers ($M_{BTE1}$, $M_{BTE2}$) of the earpiece(s) is/are transmitted to the non-wearable device where they are continually processed in the external processor (PRO) and the resulting processed signal(s) is/are transmitted back to the earpiece(s) (HA1, HA2). The low latency wireless link (LLWL) is implemented by appropriate antenna and transceiver circuitry in the wearable and non-wearable devices (cf. antenna (ANT) and wireless interface (WLIF) comprising transceiver circuitry (and possibly including the antenna (ANT) in the non-wearable device (NWD)). The non-wearable device may—in addition to (or as an alternative to) the (cabled, E-CAB) interface to the electricity net (El-Net)—comprise a local energy source, e.g. a battery, such as a rechargeable battery (cf. combined block BAT/PSIF). The local energy source may be used in situations where no connection to the electricity net is available. The processor (PRO) may be specifically adapted to support algorithms based on supervised learning, e.g. implementing one or more (e.g. trained) neural networks. Such enhanced processing supporting so-called artificial intelligence features may be implemented as a specifically adapted kernel of the processor (e.g. a digital signal processor), or it may be implemented in a dedicated processor (e.g. a Syntiant Neural Decision Processor™). Further, such processing demanding tasks may be supported by a (wired or wireless) high speed data link (WLDL) to a data network (e.g. facilitating cloud services). Thus, tasks that have to be executed fast (to be immediately reflected in the processed audio signal presented to the user) may be taken care of in the processor of the non-wearable device, whereas other tasks (whose results may be provided with a certain delay) can be taken care of remotely on a server connected to the non-wearable device via a data-connection ('cloud service').

The hearing aid system may comprise one or more wearable devices, here e.g. one hearing aid (HA1), or two hearing aids (HA1, HA2) of a binaural hearing aid system. In FIG. 2A (and 2B) the second hearing aid (HA2) is indicated in dashed outline to reflect this option. The hearing aids are illustrated as a 'receiver in the ear' style, comprising a BTE part adapted for being located behind an ear of the user and an ITE part adapted for being located in an ear canal of the user. Other styles may be used, e.g. comprising only an ITE-part. The basic components of the hearing aids are illustrated in the first hearing aid (HA1) of FIG. 2A (and described in more detail in connection with FIG. 5). The hearing aid (here the BTE-part) comprises two input transducers (e.g. microphones ($M_{BTE1}$, $M_{BTE2}$), each providing an electric input signal representing sound in the environment of the hearing aid. The hearing aid (here the ITE-part) comprises an output transducer, here a loudspeaker (SPK), for presenting sound to the user's ear drum when operationally mounted on the user. The hearing aid (here the BTE-part) further comprises two wireless transceivers ($WLR_1$, $WLR_2$), one e.g. for implementing the low latency wireless link (LLWL) to the non-wearable device, the other e.g. for implementing a wireless link (WLDL) to another device, e.g. the other hearing aid (HA2) of a binaural hearing aid system or to a phone or other communication device, e.g. for providing a connection to a data network (e.g. 4G or 5G, etc.), and thus e.g. to the Internet and 'Cloud services'. The hearing aid (here the BTE-part) further comprises a substrate whereon electronic components (here FE, DSP, MEM) are mounted and interconnected (mutually as well as with the input and output transducers and transceivers). In the embodiment of FIG. 2A (and FIG. 2B and FIG. 5) the substrate comprises the basic components front end interface (FE), digital signal processor (DSP) (comprising a hearing aid processor (cf. e.g. HA-PRO in FIG. 1A, 1B, 1C) and memory (MEM), which are further described in connection with FIG. 5. The hearing aid (here the BTE-part) further comprises a battery (BAT) for energizing electronic components of the hearing aid, possibly including such components located in the ITE-part.

As in the embodiments of FIG. 1A, 1B and 1C, a distance D between the wearable device(s) (HA1, HA2) and the non-wearable device (NWD) is indicated. When the distance D is smaller than a maximum range of the low latency wireless link (LLWL), the system can be in a system mode of operation, where hearing aid processing is performed in the non-wearable device as described above. When the distance D is larger than a maximum range of the low latency wireless link (LLWL) (or on demand from the user), the system can be in a device mode of operation, where hearing aid processing is performed in the wearable device, cf. FIG. 1B (or optionally in a further wearable device, e.g. smartphone or the like, cf. FIG. 1C) as described above.

Binaural processing adds a more natural "soundscape", it avoids the "tunnel" feeling of a mono signal by making slight differences between the left and right channels. To provide this, we need e.g. to process sound from a partner microphone for left and right ear, to reflect the direction to the microphone, seen from the user's perspective (e.g. to apply head-related transfer functions (HRTFs) to the respective wirelessly received signals). Therefore, to provide such feature, we need (in the non-wearable device) to know (or determine) the current placements of both external microphones(s) and the wearable device (e.g. a hearing aid) relative to sound source.

In case of a binaural hearing aid system comprising first and second hearing aids (wearable devices) configured to be located at left and right ears of the user, the non-wearable device (NWD) is configured to receive one or more electric input signals from both earpieces (hearing aids), here e.g. from two BTE-microphones ($M_{BTE1}$, $M_{BTE2}$) of each of the hearing aids (HA1, HA2). In such case the processor (PRO) of the non-wearable device may be configured to process the electric signals from each of the hearing devices in two audio processing paths. In such case binaural effects may be easily utilized, e.g. binaural beamforming using microphone signals from both ears (hearing aids). Likewise, values of signal levels and/or SNR at the respective ears may be used in various processing algorithms, e.g. in a level compression algorithm, in a noise reduction algorithm, etc. In such case, the processed signals transmitted from the non-wearable device to the left and right hearing aids (HA1, HA2) may be different to reflect the different acoustic environments at the left and right ears of the user (e.g. due to the shadowing effect of the user's head and body).

Figure 2B:
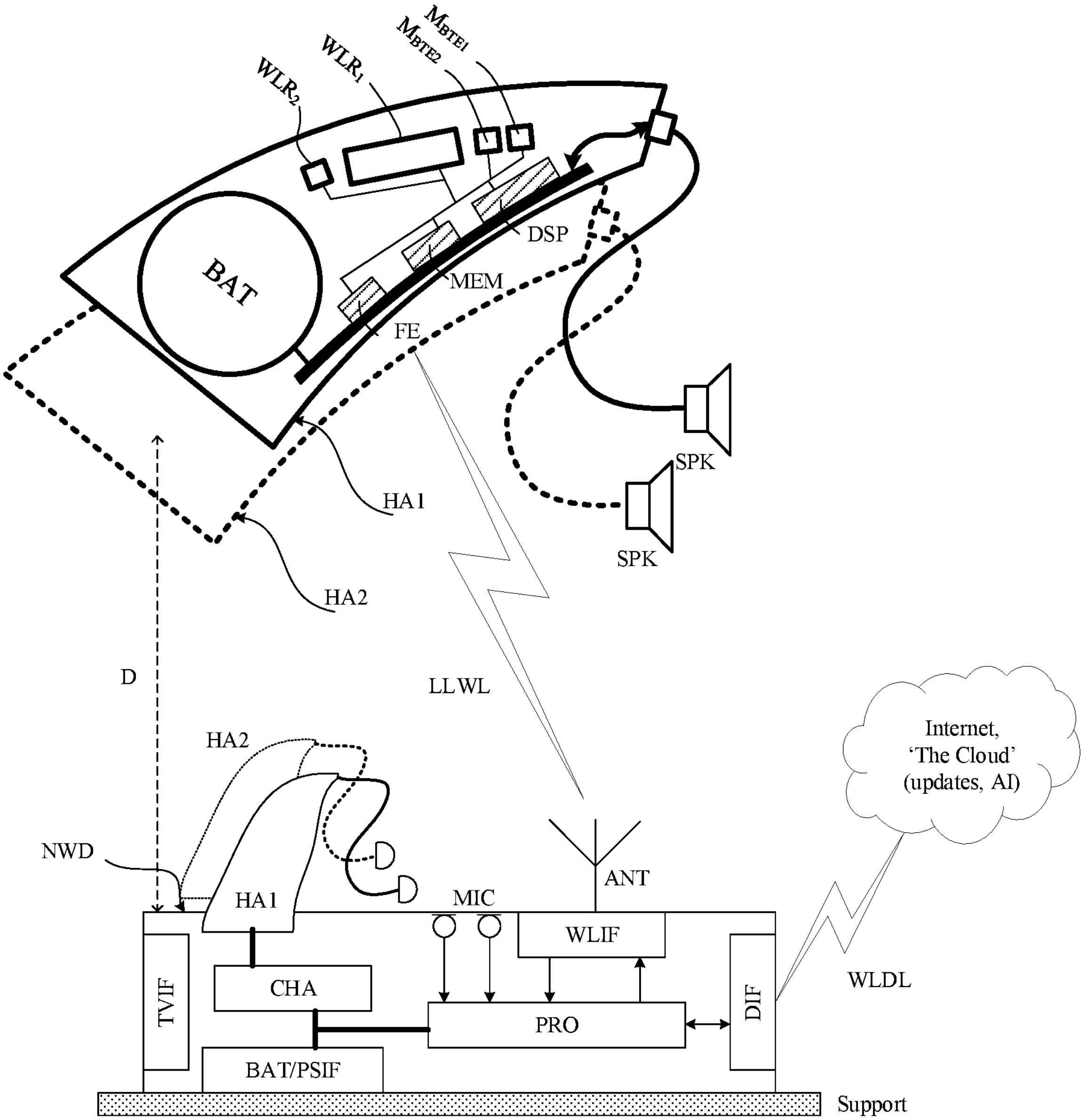
FIG. 2B illustrates a second use case a hearing aid system according to the present disclosure, where the non-wearable (but portable) device comprises a charging station.

FIG. 2B illustrates a hearing aid system according to the present disclosure, wherein the external processor is built-into a charging station. The charging station may be a pocket-size, portable, device comprising an interface to an electricity network, and/or to a local (e.g. rechargeable) battery for charging a battery or batteries of the wearable device(s), e.g. earpieces. The charging station may further be or comprise the, or a, storage facility for the wearable device(s), e.g. hearing instruments. The storage facility may e.g. be at the location of contacts for charging as indicated in the top, left part of the non-wearable device in FIG. 2B, where two hearing instruments (HA1, HA2) are positioned in contact with the charging interface (CHA). The charging station further comprises a microphone array (MIC, here two microphones are shown) for providing additional electric input signals representing sound in the environment. The microphone signals may be used as inputs to the wearable device (either as sensor inputs of the acoustic environment or as ordinary electric inputs (together with the microphone inputs of the wearable device), e.g. for being used in beamforming, e.g. for picking up sound from a person in the environment (used as a 'partner' or 'spouse' microphone) or a sensor of background noise, depending on the exact location of the non-wearable device relative to the user (wearer) and other sound sources in the environment of the user. The charging station (NWD) comprises (antenna and) transceiver circuitry (WLIF, ANT) for establishing a low latency wireless audio communication link (LLWL) to the wearable device(s) (HA1, HA2).

The processor (PRO) of the charging station (NWD) is configured to have a larger processing power than a processor of the wearable device. The processor (PRO) may in a system mode of operation (via the low latency wireless link) be electrically connected to the wearable device(s) (HA1, HA2) and configured to perform audio processing of electric input signals of the wearable device (possibly including or comprising or constituting electric input signal(s) originating from microphone(s) of the charging station) and to provide a resulting processed signal that is transmitted to the wearable device (via the low latency wireless link) for presentation to the user. The charging station may be located on a support (Support), e.g. a table, in an appropriate place with a view to being accessible to the wearable device when the user moves around.

In a specific 'partner microphone mode' of operation, the charging station has the function of a partner (or table) microphone, and is configured to transmit an electric signal picked up by the microphone array (e.g. a beamformed signal focused on a nearby sound source, e.g. a talker) to the wearable device for presentation to the user, e.g. alone, or in combination with signal(s) from the microphone(s) of the wearable device. In such mode, the charging station may be located on a support (Support), e.g. placed near one or more persons expected to provide sound of interest to the user.

In addition to the charging function, the charging station may comprise an interface to a TV for providing streaming of TV-sound to the wearable device(s), e.g. hearing aid(s). In a specific TV-mode of operation, the charging station has the function of a TV-interface, and is configured to transmit an electric signal representing (current) sound from the TV (e.g. corresponding to TV-images currently being presented by the TV) to the wearable device for presentation to the user, e.g. alone, or in combination with signal(s) from the microphone(s) of the wearable device.

The (e.g. portable) charging station comprises a local (e.g. rechargeable) battery, e.g. as an alternative to, or in addition to a connector to the electricity network (cf. unit BAT/PSIF in FIG. 2B). Thereby the charging station can provide its function (at least its function as an external processor and/or as table microphone for the wearable device) for a limited time, even in the absence of access to the electricity network. The battery of the charging station is assumed to have a significantly larger capacity than a battery of the wearable device (e.g. a hearing aid), e.g. ≥ a factor 10-100.

The non-wearable device may, in addition to charging the non-wearable device, provide a (possibly supplementary or alternative) user interface (UI) for the hearing aid system, e.g. implemented as a graphical user interface, e.g. using a touch sensitive screen, or individual activation elements or indicators. The user interface may e.g. allow a user to control functions of the charging process, as well as functionality of the processing related to the wearable device(s), e.g. control of volume, control of hearing aid programs, etc. The user interface may e.g. allow a user to control the use of the microphone(s) of the non-wearable device, e.g. either as a table microphone to be a) a partner microphone whose signal is forwarded to the wearable device(s) for presentation to the user, or b) an own voice microphone whose signal is forwarded to a remote device or system, or c) as a noise estimation microphone whose signal is be processed in a beamformer noise reduction system of the processor of the non-wearable device to contribute to the processed signal (e.g. together with microphones of the wearable device(s)) to be delivered to the wearable device(s) for presentation to the user. The user interface may e.g. allow a user to control functions of processing to take place in the wearable device during charging (e.g. when the user is asleep), e.g. to check for (and possibly download) software or firmware updates via a network server, to offload logged data from the wearable device(s), to update (customize) parameters of learning algorithms of the hearing aid system, etc.

The charging station may further comprise an interface (DIF) to a data network. The interface is configured to establish a (here wireless) connection to the data network (cf. link WLDL, e.g. WiFi) e.g. to provide access to servers on the Internet (cloud computing).

Access to the Internet is an important feature of modern wearable devices (e.g. hearing aids), e.g. to enable firmware (FW) updates of the non-wearable device and the wearable device(s). Likewise, for updates of processing parameters, or access to external 'server farms' for "heavy" AI processing.

Figure 3:
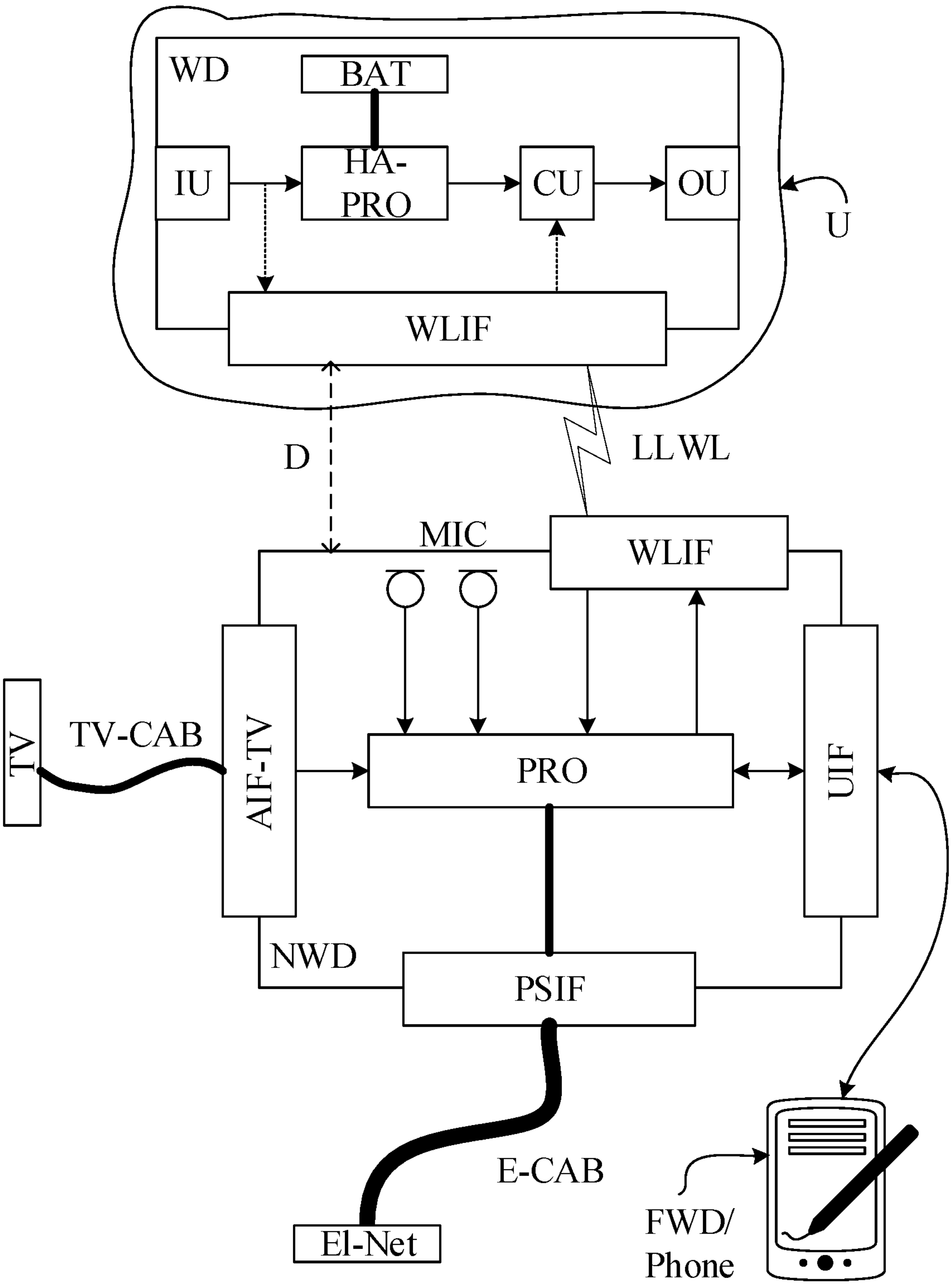
FIG. 3 shows an embodiment of a hearing aid system according to the present disclosure in a system mode of operation.

FIG. 3 shows an embodiment of a hearing aid system according to the present disclosure in a system mode of operation. The embodiment of FIG. 3 is similar to the embodiment of FIG. 2A, wherein the non-wearable device comprises an audio interface (AIF) to a sound delivery device (here a TV). The embodiment of FIG. 3 further comprises a user interface implemented as an APP of a further wearable device (FWD/Phone) (e.g. a smartphone), cf. e.g. auxiliary device (AD) in FIG. 4A, 4B and the description in connection therewith. Compared to the embodiment of FIG. 2A, the non-wearable device further includes a microphone array (MIC, as described in connection with FIG. 2B). The signals from the microphone array (MIC) may, as described in FIG. 2B, be used in the processing of the electric input signals of the wearable device (WD) (for directionality or other noise reducing tasks, and/or as a partner microphone). The further wearable device (FWD/Phone) is connected to the non-wearable device (NWD) via a cabled or wireless interface (UIF).

The internal microphone array of the non-wearable device is an "easy to deploy" solution for extra microphones. These microphones can help to detect ambient noise or other speakers.

Combined with the location and sound from the hearing aid microphones, the non-wearable device has access to more sound information and can e.g. thereby exclude more noise.

Figure 4A:
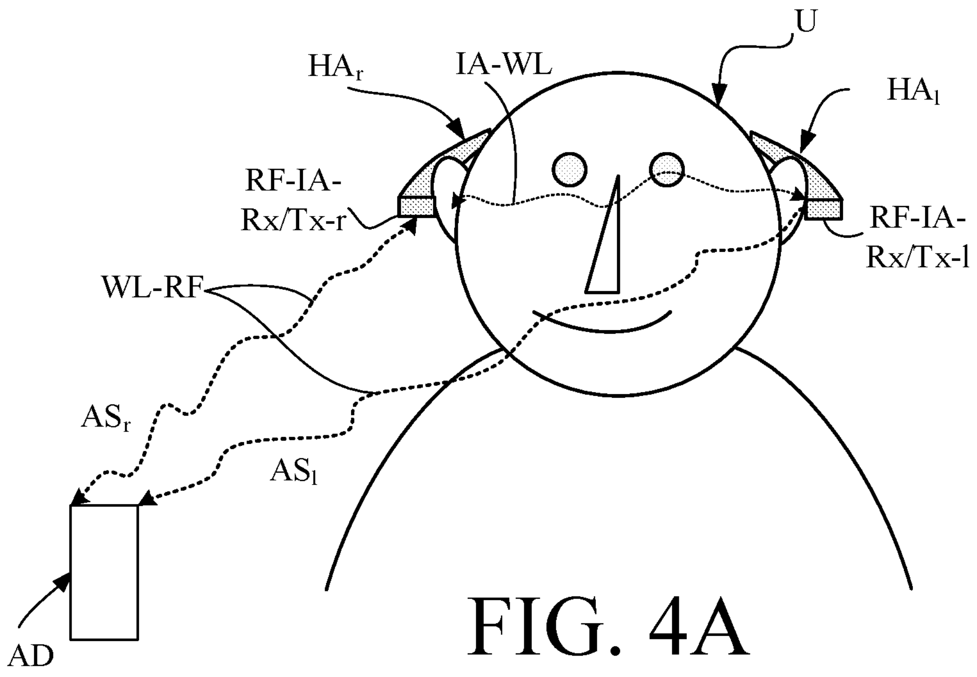
FIG. 4A shows a user wearing a binaural hearing aid system and an auxiliary device, the auxiliary device being configured to implement a user interface for the hearing aid system as an APP.
Figure 4B:
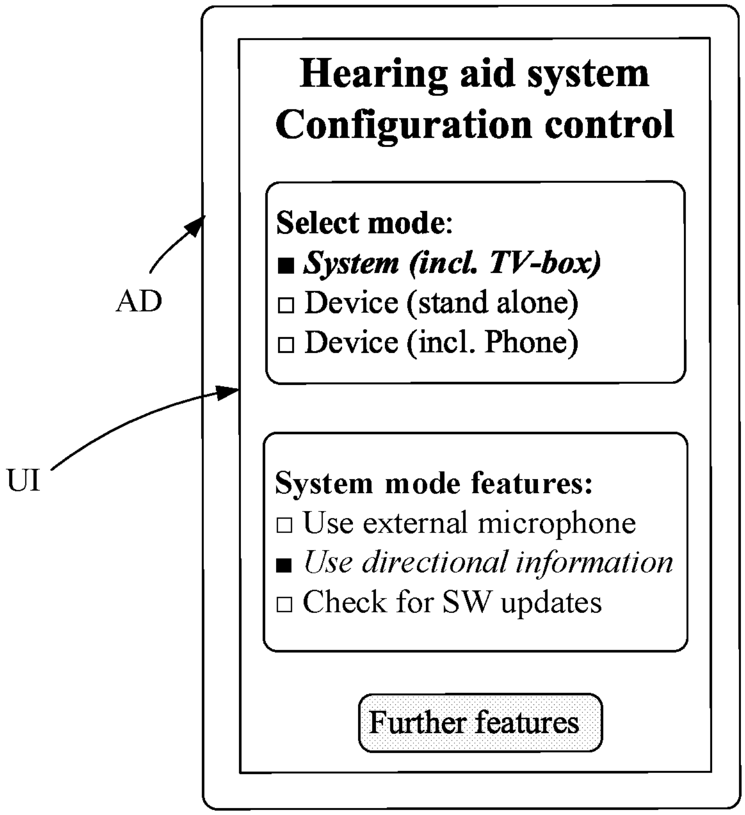
FIG. 4B illustrates the auxiliary device running an APP for configuring the hearing aid system in relation to various processing modes of operation.

FIG. 4A shows a user (U) wearing a binaural hearing aid system and an auxiliary device (AD), the auxiliary device being configured to implement a user interface (UI) for the hearing aid system as an APP. FIG. 4A shows an embodiment of a head-worn binaural hearing aid system comprising left and right wearable devices in the form of hearing aids ($HA_1$, $HA_r$) in communication with a portable (handheld) auxiliary device (AD) functioning as a user interface (UI) for the binaural hearing aid system. The binaural hearing aid system may comprise the auxiliary device AD (and the user interface UI). The user interface (e.g. the APP) may form part of the hearing aid system. An exemplary screen of the user interface (UI) of the auxiliary device (AD) is shown in FIG. 4B. The auxiliary device (AD) may comprise a cellular telephone, e.g. a smartphone. In the embodiment of FIG. 4A, the hearing aids and the auxiliary device are configured to establish wireless links (WL-RF) between them, e.g. in the form of digital transmission links, e.g. according to the Bluetooth standard (e.g. Bluetooth Low Energy, or equivalent technology), or to the ultra-wide band technology (UWB). The links may alternatively be implemented in any other convenient wireless and/or wired manner, and according to any appropriate modulation type or transmission standard, possibly different for different audio sources. The hearing aids ($HA_1$, $HA_r$) are shown in FIG. 4A as devices mounted at the ear (behind the ear) of a user (U), cf. also FIG. 5. Other styles may be used, e.g. located completely in the ear (e.g. in the ear canal), fully or partly implanted in the head, etc. As indicated in FIG. 4A, each of the hearing instruments may comprise a wireless transceiver to establish an interaural wireless link (IA-WL) between the hearing aids, e.g. based on inductive communication or RF communication (e.g. Bluetooth technology). Each of the hearing aids further comprises a transceiver for establishing a wireless link (WL-RF, e.g. based on radiated fields (RF)) to the auxiliary device (AD), at least for receiving and/or transmitting signals, including audio signals (ASr, ASO and possibly control signals or information signals. The transceivers are indicated by RF-IA-Rx/Tx-r and RF-IA-Rx/Tx-1 in the right ($HA_r$) and left ($HA_1$) hearing aids, respectively.

FIG. 4B illustrates the auxiliary device (AD) running an APP for configuring the hearing aid system in relation to various processing modes of operation. The user interface (UI) comprises a display (e.g. a touch sensitive display) displaying guidance to the user to select an appropriate mode of operation of the hearing aid system (in particular related to the audio processing of the input (sound) signal(s) of the hearing aid(s)). The user interface is implemented as an APP on the auxiliary device (e.g. a smartphone). The APP is denoted 'Hearing aid system Configuration control'. Via the display of the user interface (upper box on the screen, denoted 'Select mode:'), the user U is instructed to select a processing mode of operation, either the 'system mode', the 'device (a) mode' or the 'device (b) mode' (denoted 'System (incl. TV-box)', 'Device (stand-alone)' and 'Device (incl. Phone)' in FIG. 4B). The mode is selected by pressing the 'button' in question, which when selected is indicated by a solid square in front of the mode in question (here the 'System (incl. TV-box)' mode is selected as also indicated by boldface, italic letters. The non-selected modes are indicated by an open square in front of the mode in question. Further system features (relevant for the chosen mode of operation) are listed in the lower box denoted 'System mode features:'. The further features in the system mode of operation (where the wearable device (here the left and right hearing aids) is in communication with the non-wearable device (here a TV-box comprising an audio interface to a TV, see e.g. FIG. 3)) are individually selectable (as indicated by the square 'tick-boxes' in front of each further feature), here exemplified by the features: 'Use external microphone', 'Use directional information', 'Check for SW updates'. Here, the feature 'Use directional information' has been selected by the user (indicating that directional information provided by the non-wearable device (here the TV-Box) is utilized in the processing of the electric input signal(s) captured by the wearable device(s), e.g. in that microphone signals of the TV-Box (cf. MIC in FIG. 3) are included as inputs to a beamformer, e.g. to focus on a particular speaker in the environment, e.g. a communication partner. Even further features may be available by pressing the grey shaded button 'Further features'. In addition to the beamformer, frequency filtering can also be used, e.g. to filter away low- or high-frequency non-voice noise.

The APP may e.g. be used to localize a smartphone of a person (name, etc.) in the environment of the user (e.g. family or friends or other persons having installed the APP on their smartphones). The APP may be configured to send identification and voice characteristics (e.g. voice samples) of the given person to the non-wearable device. This can e.g. be used to apply frequency shaping to the voice of said person or to train a neural network to improve speech intelligibility of said person's voice for the user of the hearing aid system. Such processing of the voice date of a given person or persons (to determine settings of a filter (or optimized weights of a neural network) to provide improved speech intelligibility for the user) may e.g. be carried out in the non-wearable device during selected time periods. Such selected time periods may e.g. include a nightly processing session, e.g. where the hearing aid system, e.g. earpieces are being charged in a non-wearable device comprising a charging station (providing processing power to the hearing aid system).

Figure 5:
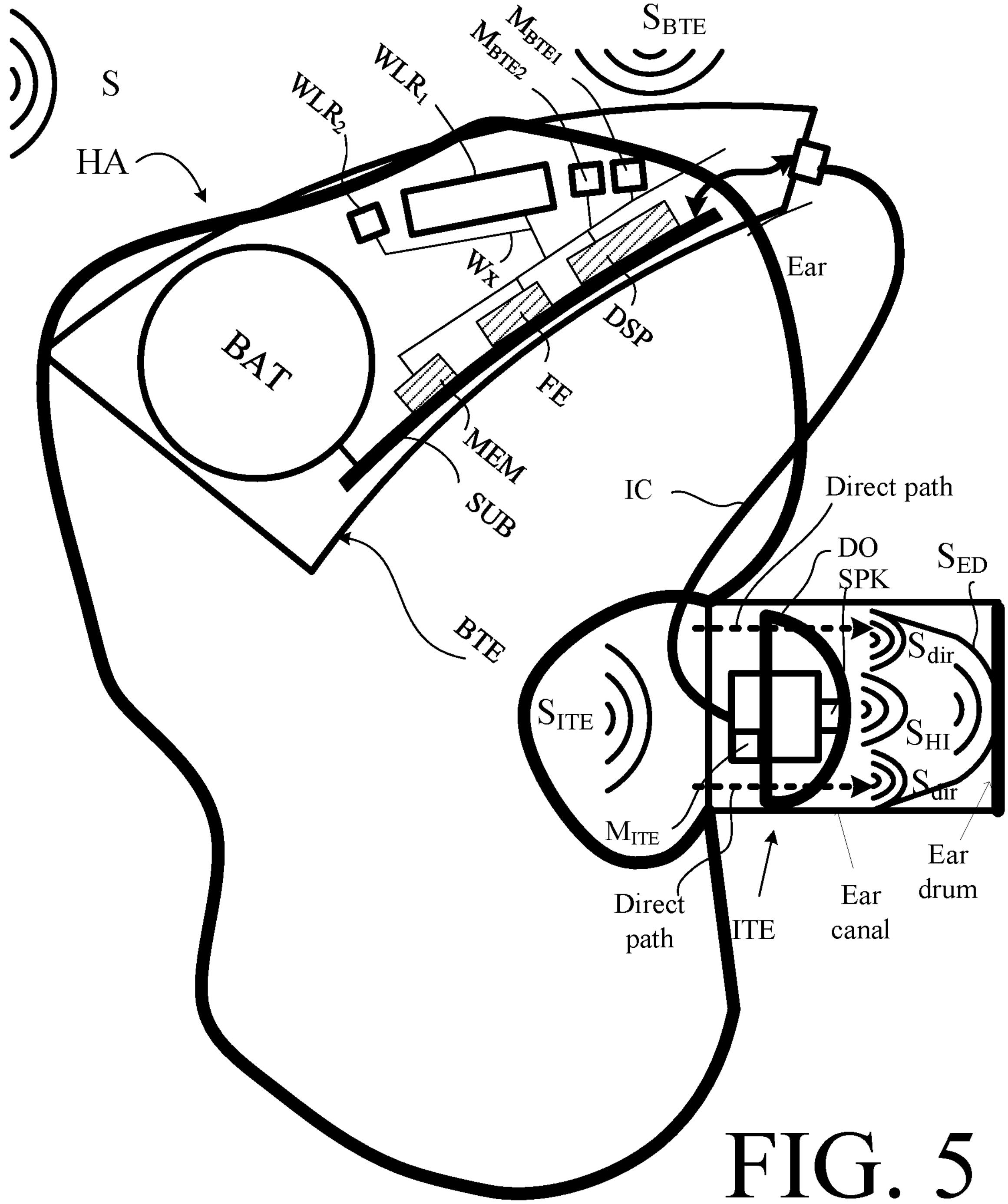
FIG. 5 shows an embodiment of a wearable device (hearing aid) according to the present disclosure, The figures are schematic and simplified for clarity, and they just show details which are essential to the understanding of the disclosure, while other details are left out. Throughout, the same reference signs are used for identical or corresponding parts.

FIG. 5 shows an embodiment of a wearable device (hearing aid) according to the present disclosure. FIG. 5 shows a hearing aid (HA) of the receiver in the ear type according to an embodiment of the present disclosure. FIG. 5 shows a BTE/RITE style hearing aid (BTE='Behind-The-Ear'; RITE=Receiver-In-The-Ear') comprising a BTE-part (BTE) adapted for being located at or behind an ear of a user, and an ITE-part (ITE) adapted for being located in or at an ear canal of the user's ear and comprising a receiver (=loudspeaker, SPK). The BTE-part and the ITE-part are connected (e.g. electrically connected) by a connecting element (IC) and internal wiring in the ITE- and BTE-parts (cf. e.g. wiring Wx in the BTE-part). The connecting element may alternatively be fully or partially constituted by a wireless link between the BTE- and ITE-parts. Other styles, e.g. where the ITE-part comprises or is constituted by a custom mould adapted to a user's ear and/or ear canal, may of course be used.

In the embodiment of a hearing aid in FIG. 5, the BTE part comprises an input stage comprising two input transducers (e.g. microphones) ($MBTE_1$, $MBTE_2$), each for providing an electric input audio signal representative of an input sound signal (SBTE) (originating from a sound field S around the hearing aid). The input stage further comprises two wireless receivers ($WLR_1$, $WLR_2$) (or transceivers) for providing respective directly received auxiliary audio and/or control input signals (and/or allowing transmission of audio and/or control signals to other devices, e.g. a remote control or processing device (e.g. the non-wearable device NWD of FIG. 1A, 1B, 1C, 2A, 2B, 3), or a telephone (e.g. the further wearable device of FIG. 1C, or the auxiliary device of FIG. 4A, 4B), or another hearing aid (see e.g. FIG. 4A). The hearing aid (HA) comprises a substrate (SUB) whereon a number of electronic components are mounted, including a memory (MEM), e.g. storing different hearing aid programs, e.g. including programs for different modes of operation according the present disclosure (e.g. including user specific data, e.g. related to an audiogram, or parameter settings derived therefrom, e.g. defining such (user specific) programs, or other parameters of algorithms, e.g. beamformer filter weights, and/or fading parameters) and/or hearing aid configurations, e.g. input source combinations ($MBTE_1$, $MBTE_2$ ($M_{ITE}$), $WLR_1$, $WLR_2$), e.g. optimized for a number of different listening situations or modes of operation (see e.g. FIG. 1A, 1B, 1C, 2A, 2B, 3). The substrate (SUB) further comprises a configurable signal processor (DSP, e.g. a digital signal processor), e.g. including a processor for applying a frequency and level dependent gain, e.g. providing beamforming, noise reduction, filter bank functionality, and other digital functionality of a hearing aid, e.g. implementing features according to the present disclosure. The configurable signal processor (DSP) is adapted to access the memory (MEM) e.g. for selecting appropriate parameters for a current configuration or mode of operation and/or listening situation and/or for writing data to the memory (e.g. algorithm parameters, e.g. for logging user behavior). The configurable signal processor (DSP) is further configured to process one or more of the electric input audio signals and/or one or more of the directly received auxiliary audio input signals, based on a currently selected (activated) mode of operation (and corresponding hearing aid program/parameter settings). The mode of operation may e.g. be either automatically selected, e.g. based on one or more sensors, or wireless link quality parameters, selected based on inputs from a user interface (see e.g. FIG. 4A, 4B). The mentioned functional units (as well as other components) may be partitioned in circuits and components according to the application in question (e.g. with a view to size, power consumption, analogue vs. digital processing, acceptable latency, etc.), e.g. integrated in one or more integrated circuits, or as a combination of one or more integrated circuits and one or more separate electronic components (e.g. inductor, capacitor, etc.). The configurable signal processor (DSP) provides a processed audio signal, which is intended to be presented to a user. The substrate further comprises a front-end IC (FE) for interfacing the configurable signal processor (DSP) to the input and output transducers, etc., and typically comprising interfaces between analogue and digital signals (e.g. interfaces to microphones and/or loudspeaker(s), and possibly to sensors/detectors). The input and output transducers may be individual separate components, or integrated (e.g. MEMS-based) with other electronic circuitry.

The hearing aid (HA) further comprises an output stage (e.g. an output transducer) providing stimuli perceivable by the user as sound based on a processed audio signal from the processor or a signal derived therefrom. In the embodiment of a hearing aid in FIG. 5, the ITE part comprises (at least a part of) the output stage in the form of a loudspeaker (also termed a 'receiver') (SPK) for converting an electric signal to an acoustic (air borne) signal, which (when the hearing aid is mounted at an ear of the user) is directed towards the ear drum (Ear drum), where sound signal ($S_{ED}$) is provided. The ITE-part further comprises a guiding element, e.g. a dome, (DO) for guiding and positioning the ITE-part in the ear canal (Ear canal) of the user. In the embodiment of FIG. 5, the ITE-part further comprises a further input transducer, e.g. a microphone ($M_{ITE}$), for providing an electric input audio signal representative of an input sound signal ($S_{ITE}$) at the ear canal. Propagation of sound ($S_{ITE}$) from the environment to a residual volume at the ear drum via direct acoustic paths through the semi-open dome (DO) are indicated in FIG. 5 by dashed arrows (denoted Direct path). The directly propagated sound (indicated by sound fields $S_{dir}$) is mixed with sound from the hearing aid (HA) (indicated by sound field $S_{HI}$) to a resulting sound field ($S_{ED}$) at the ear drum. The ITE-part may comprise a (possibly custom made) mould for providing a relatively tight fitting to the user's ear canal. The mould may comprise a ventilation channel to provide a (controlled) leakage of sound from the residual volume between the mould and the ear drum (to manage the occlusion effect).

The electric input signals (from input transducers $M_{BTE1}$, $M_{BTE2}$, $M_{ITE}$) may be processed in the time domain or in the (time-) frequency domain (or partly in the time domain and partly in the frequency domain as considered advantageous for the application in question).

In the embodiment of FIG. 5, the connecting element (IC) comprises electric conductors for connecting electric components of the BTE and ITE-parts. The connecting element (IC) may comprise an electric connector (CON) to attach the cable (IC) to a matching connector in the BTE-part. In another embodiment, the connecting element (IC) is an acoustic tube and the loudspeaker (SPK) is located in the BTE-part. In a still further embodiment, the hearing aid comprises no BTE-part, but the whole hearing aid is housed in the ear mould (ITE-part).

The embodiment of a hearing aid (HA) exemplified in FIG. 5 is a portable (wearable) device comprising a battery (BAT), e.g. a rechargeable battery, e.g. based on Li-Ion battery technology, e.g. for energizing electronic components of the BTE- and possibly ITE-parts. In an embodiment, the hearing aid is adapted to provide a frequency dependent gain and/or a level dependent compression and/or a transposition (with or without frequency compression of one or more frequency ranges to one or more other frequency ranges), e.g. to compensate for a hearing impairment of a user. The BTE-part may e.g. comprise a connector (e.g. a DAI or USB connector) for connecting a 'shoe' with added functionality (e.g. an FM-shoe or an extra battery, etc.), or a programming device, or a charger, etc., to the hearing aid (HA). Alternatively, or additionally, the hearing aid may comprise a wireless interface for programming and/or charging the hearing aid.

An exemplary application scenario of the present disclosure may comprise two hearing aids of a binaural hearing aid system (wearable devices) and a non-wearable device (e.g. a TV-interface device or a charging station for the hearing aids) comprising an internal microphone array and a connection to a TV and/or a charging interface, e.g. located in a room in the user's home. The user wearing the binaural hearing aid system may further possess a smartphone (further wearable device), Further, external, e.g. wall-mounted, microphones in communication with the non-wearable device, may be installed in the room. Camera(s) and PIR-sensors in communication with the non-wearable device, and one or more partner microphone(s) worn by possible other person's in the room may be connectable to the hearing aid(s), e.g. via the non-wearable device,.

It is intended that the structural features of the devices described above, either in the detailed description and/or in the claims, may be combined with each other.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

REFERENCES

U.S. Pat. No. 5,721,783 (James Anderson) 24.02.1998

The invention claimed is:

1. A non-wearable device configured for establishing a wireless audio communication link with a hearing aid, the non-wearable device comprising:

- a processor configured to receive at least one electrical input signal from the hearing aid and process the at least one electrical input signal to at least partially compensate for hearing impairment of a user of the hearing aid;
- a power supply interface configured to provide power to the processor; and
- transceiver circuitry configured to establish the wireless audio communication link with the hearing aid;
- wherein the non-wearable device is integrated with another device having a specific other function, wherein the specific other function is at least one of: an audio interface to a television, a telephone, or other audio device; and
  - a charging interface to the hearing aid,
- wherein the processor is configured to receive a mode control signal for controlling whether the hearing aid is in a system mode or in a device mode of operation.

2. The non-wearable device of claim 1 wherein the power supply interface is configured to be electrically connected to an electricity network.

3. The non-wearable device of claim 1, wherein the non-wearable device comprises a user interface configured for operating the non-wearable device and the hearing aid.

4. The non-wearable device of claim 1, wherein the non-wearable device comprises a local energy source.

5. The non-wearable device of claim 1, wherein the specific function is the audio interface to a television, a telephone, or other audio device.

6. The non-wearable device of claim 1, wherein the specific function is the charging interface to the hearing aid.

7. The non-wearable device of claim 1, wherein the wireless audio communication link has a latency that is below 8 ms.

8. A non-wearable device configured for establishing a wireless audio communication link with a hearing aid, the non-wearable device comprising:

- a processor configured to receive at least one electrical input signal from the hearing aid and process the at least one electrical input signal to at least partially compensate for hearing impairment of a user of the hearing aid;
- a power supply interface configured to provide power to the processor; and
- transceiver circuitry configured to establish the wireless audio communication link with the hearing aid,
- wherein the non-wearable device is configured to charge the hearing aid, and
- wherein the processor is configured to receive a mode control signal for controlling whether the hearing aid is in a system mode or in a device mode of operation.

9. The non-wearable device of claim 8, wherein the non-wearable device comprises a user interface configured for operating the non-wearable device and the hearing aid.

10. The non-wearable device of claim 8, wherein the non-wearable device comprises a microphone configured to receive an audio signal, and wherein the non-wearable device is configured to process the at least one electrical input signal based on the audio signal.

11. The non-wearable device of claim 8, wherein the non-wearable device is configured to be electrically connected to an electricity network.

12. The non-wearable device of claim 8, wherein the non-wearable device is configured to store the hearing aid.

13. The non-wearable device of claim 8, wherein the wireless audio communication link has a latency that is below 8 ms.

* * * * *